United States Patent
Yokoyama

(10) Patent No.: US 9,661,185 B2
(45) Date of Patent: May 23, 2017

(54) APPARATUS THAT PRODUCES GUIDANCE DISPLAY FOR LOGIN, CONTROL METHOD OF THE APPARATUS, AND STORAGE MEDIUM

(71) Applicant: CANON KABUSHIKI KAISHA, Tokyo (JP)

(72) Inventor: Junnosuke Yokoyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/971,368

(22) Filed: Dec. 16, 2015

(65) Prior Publication Data
US 2016/0191746 A1  Jun. 30, 2016

(30) Foreign Application Priority Data

Dec. 25, 2014  (JP) .................. 2014-262480

(51) Int. Cl.
| | |
|---|---|
| H04N 1/00 | (2006.01) |
| H04N 1/44 | (2006.01) |
| H04L 29/06 | (2006.01) |
| G06K 9/00 | (2006.01) |
| H04W 4/00 | (2009.01) |
| H04W 12/06 | (2009.01) |

(52) U.S. Cl.
CPC ......... *H04N 1/442* (2013.01); *G06K 9/00362* (2013.01); *H04L 63/0815* (2013.01); *H04L 63/0853* (2013.01); *H04L 63/0861* (2013.01); *H04L 63/0876* (2013.01); *H04N 1/0049* (2013.01); *H04N 1/00411* (2013.01); *H04W 4/008* (2013.01); *H04N 2201/0094* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 8,037,521 | B2 * | 10/2011 | Minato | G06F 21/31 726/16 |
| 8,766,771 | B2 * | 7/2014 | Mori | G06F 3/0481 340/3.1 |
| 8,896,856 | B2 * | 11/2014 | Uchikawa | H04N 1/00915 358/1.13 |
| 2014/0157032 | A1 * | 6/2014 | Yokoyama | G06F 1/3215 713/323 |

FOREIGN PATENT DOCUMENTS

JP        2010263484 A        11/2010

* cited by examiner

*Primary Examiner* — Paul F Payer
(74) *Attorney, Agent, or Firm* — Rossi, Kimms & McDowell LLP

(57) ABSTRACT

In the case where a user in the login state exists, the control unit: controls, on a condition that the multi-login is set to be ineffective, the guidance display unit to turn its light off regardless of whether or not a person is detected by the human sensor; and controls, on a condition that the multi-login is set to be effective, the guidance display unit to turn its light on when a person is detected by the human sensor and controls the guidance display unit to turn its light off when that no person is detected by the human sensor.

11 Claims, 27 Drawing Sheets

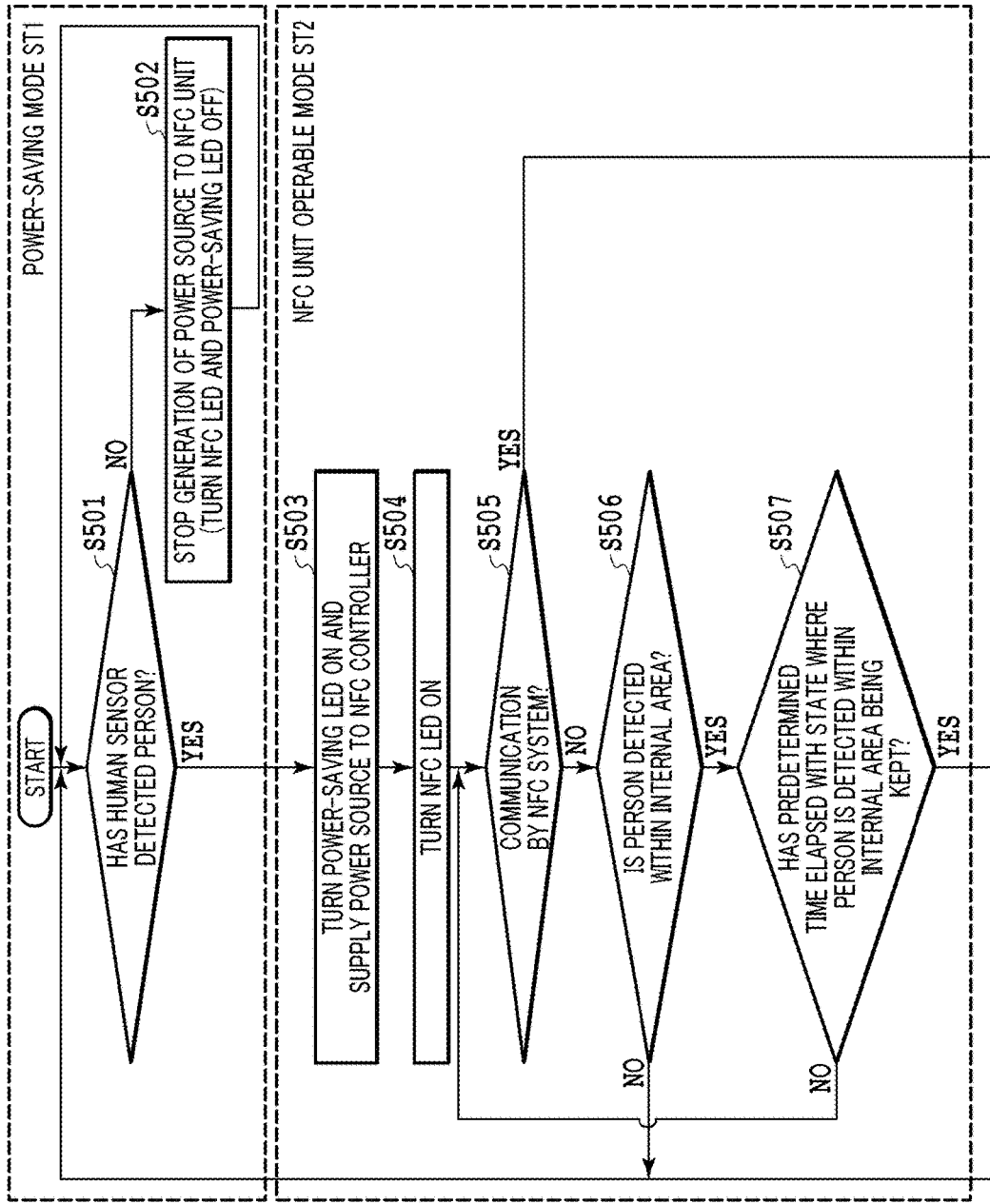

⟨POWER-SAVING MODE ST1⟩

<NORMAL POWER MODE ST4>

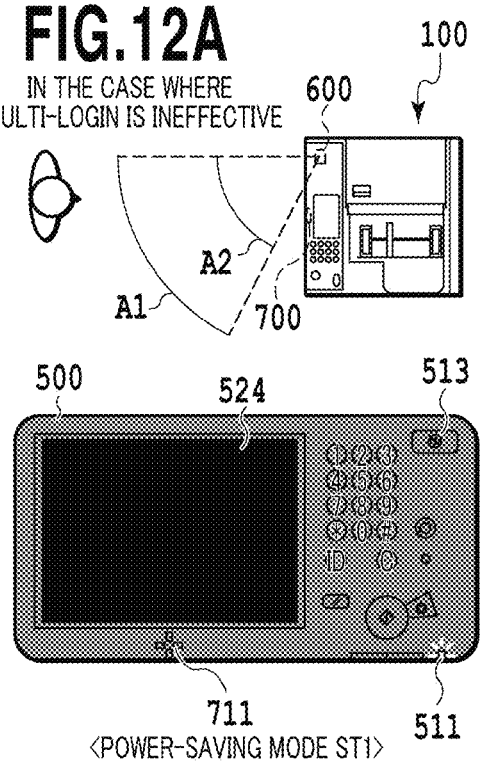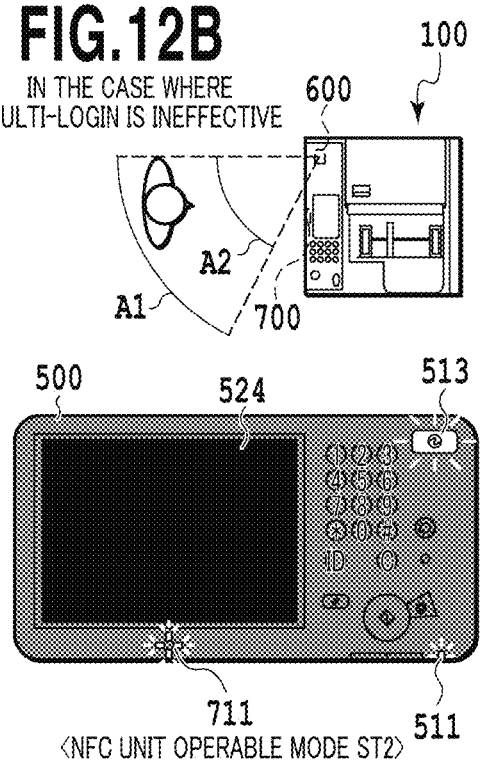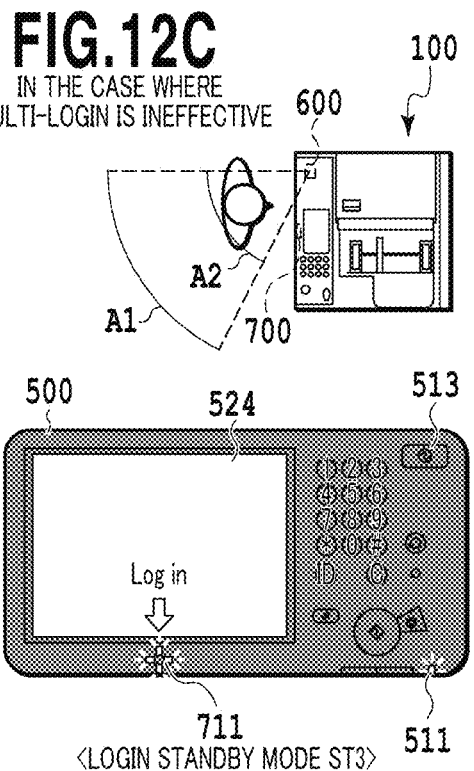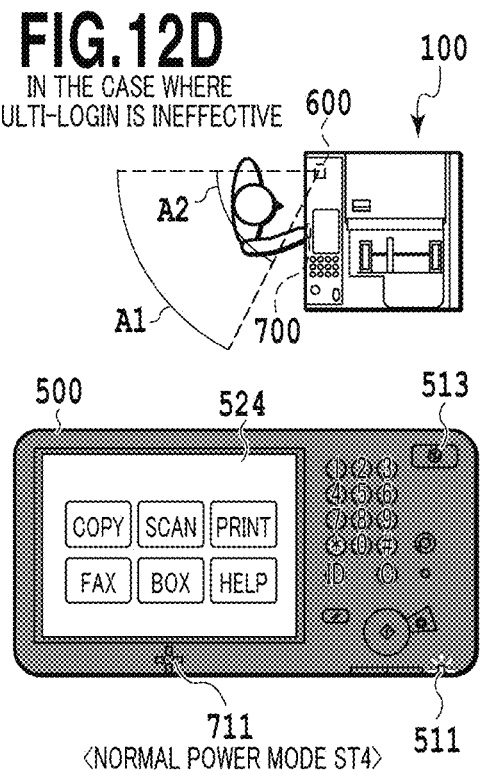

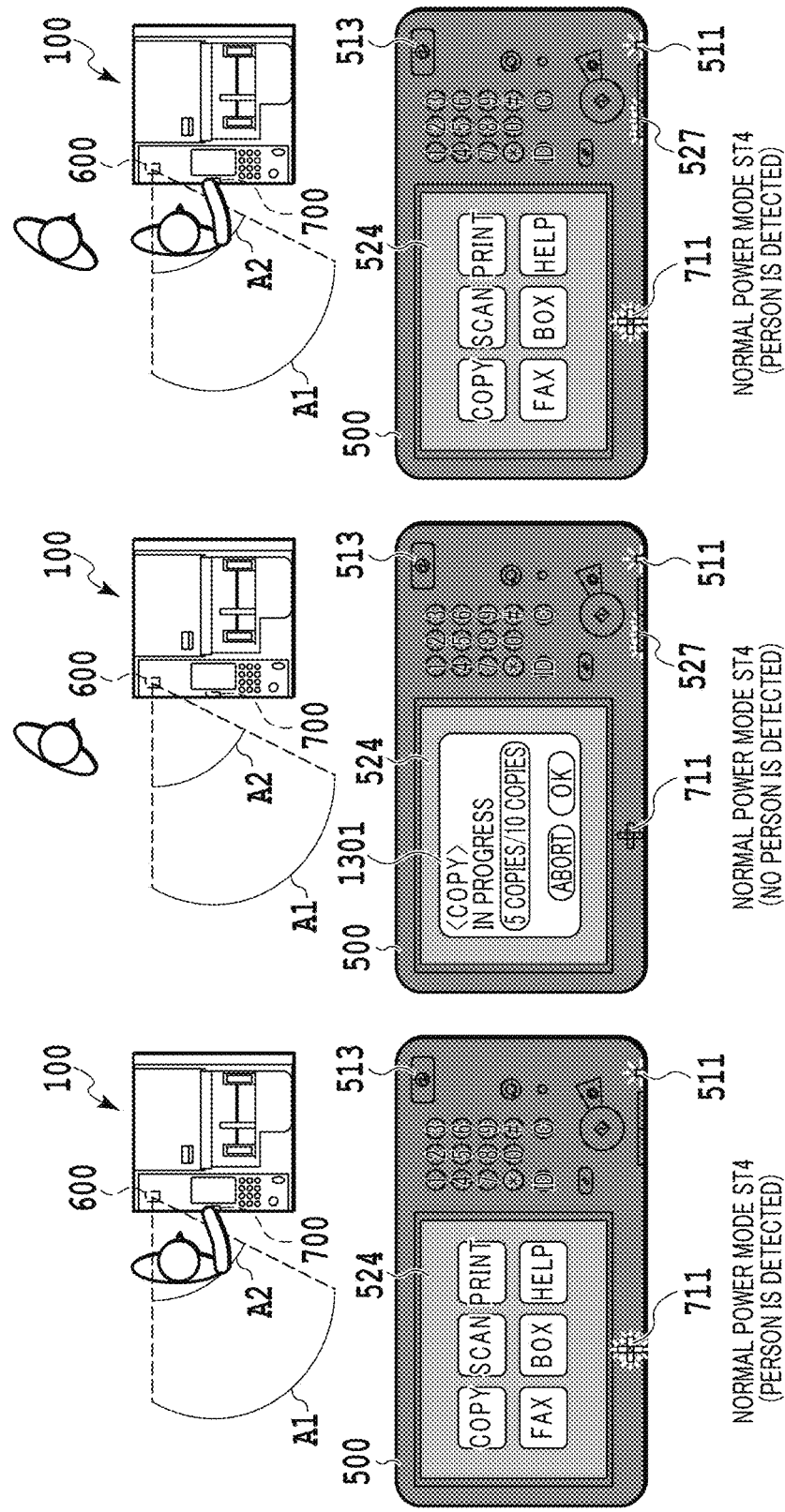

| MULTI-LOGIN SETTING | STATE OF APPARATUS | DETECTION STATE OF HUMAN SENSOR | NFC LED | POWER-SAVING LED |
|---|---|---|---|---|
| INEFFECTIVE | POWER-SAVING MODE ST1 | NONE | UNLIT STATE | UNLIT STATE |
| | NFC UNIT OPERABLE MODE ST2 | A1 | LIT STATE | LIT STATE |
| | LOGIN STANDBY MODE ST3 | A2 | LIT STATE | UNLIT STATE |
| | NORMAL POWER MODE ST4 | NONE | UNLIT STATE | UNLIT STATE |
| | | A1 OR A2 | UNLIT STATE | UNLIT STATE |
| EFFECTIVE | POWER-SAVING MODE ST1 | NONE | UNLIT STATE | UNLIT STATE |
| | NFC UNIT OPERABLE MODE ST2 | A1 | LIT STATE | LIT STATE |
| | LOGIN STANDBY MODE ST3 | A2 | UNLIT STATE | UNLIT STATE |
| | NORMAL POWER MODE ST4 | NONE | LIT STATE | UNLIT STATE |
| | | A1 OR A2 | UNLIT STATE | UNLIT STATE |

FIG.14

⟨POWER-SAVING MODE ST1'⟩

<LOGIN STANDBY MODE ST3'>

<NFC UNIT CONJUNCTION EFFECTIVE MODE ST5'>

IN THE CASE WHERE MULTI-LOGIN IS INEFFECTIVE

<POWER-SAVING MODE ST1'>

IN THE CASE WHERE MULTI-LOGIN IS INEFFECTIVE

<CARD READER UNIT OPERABLE MODE ST2'>

IN THE CASE WHERE MULTI-LOGIN IS INEFFECTIVE

<LOGIN STANDBY MODE ST3'>

IN THE CASE WHERE MULTI-LOGIN IS INEFFECTIVE

IN THE CASE WHERE MULTI-LOGIN IS INEFFECTIVE

IN THE CASE WHERE MULTI-LOGIN IS EFFECTIVE

NORMAL POWER MODE ST4' (PERSON IS DETECTED)

IN THE CASE WHERE MULTI-LOGIN IS EFFECTIVE

NORMAL POWER MODE ST4' (NO PERSON IS DETECTED)

| MULTI-LOGIN SETTING | STATE OF APPARATUS | DETECTION STATE OF HUMAN SENSOR | CARD READER LED | NFC LED | POWER-SAVING LED |
|---|---|---|---|---|---|
| INEFFECTIVE | POWER-SAVING MODE ST1' | NONE | UNLIT STATE | | UNLIT STATE |
| | CARD READER UNIT OPERABLE MODE ST2' | A1 | LIT STATE | UNLIT STATE | LIT STATE |
| | | A2 | LIT STATE | | UNLIT STATE |
| | LOGIN STANDBY MODE ST3' | NONE | UNLIT STATE | | UNLIT STATE |
| | NORMAL POWER MODE ST4' | A1 OR A2 | UNLIT STATE | | UNLIT STATE |
| | | NONE | UNLIT STATE | LIT STATE | UNLIT STATE |
| | NFC UNIT CONJUNCTION EFFECTIVE MODE ST5' | A1 OR A2 | UNLIT STATE | | UNLIT STATE |
| EFFECTIVE | POWER-SAVING MODE ST1' | NONE | UNLIT STATE | | UNLIT STATE |
| | CARD READER UNIT OPERABLE MODE ST2' | A1 | LIT STATE | UNLIT STATE | LIT STATE |
| | | A2 | LIT STATE | | UNLIT STATE |
| | LOGIN STANDBY MODE ST3' | NONE | LIT STATE | | UNLIT STATE |
| | NORMAL POWER MODE ST4' | A1 OR A2 | UNLIT STATE | | UNLIT STATE |
| | | NONE | UNLIT STATE | LIT STATE | UNLIT STATE |
| | NFC UNIT CONJUNCTION EFFECTIVE MODE ST5' | A1 OR A2 | UNLIT STATE | | UNLIT STATE |

FIG.25

APPARATUS THAT PRODUCES GUIDANCE DISPLAY FOR LOGIN, CONTROL METHOD OF THE APPARATUS, AND STORAGE MEDIUM

BACKGROUND OF THE INVENTION

Field of the Invention

The present invention relates to a guidance display technique in an apparatus capable of multi-login.

Description of the Related Art

A recent image forming apparatus includes a function to display a customized screen dedicated to each user and an ID authentication (user authentication) function to securely print a document of each user.

For example, Japanese Patent Laid-Open No. 2010-263484 has disclosed the technique to display a customized screen unique to a user by including an NFC reader/writer and reading information held within an NFC compatible device, such as a smart phone.

In the image forming apparatus adopting the technique of Japanese Patent Laid-Open No. 2010-263484 described above, in the case where the supply of power to the NFC reader/write is cut off in the power-saving mode for power saving, it is no longer possible to perform communication even by performing the touch operation using the NFC compatible device. Consequently, at the time of the power-saving mode such as this, the user will be confused because it is not possible to determine whether the image forming apparatus is in the state where the communication by the NFC system can be performed, whether it is necessary to press down, for example, the power-saving button, in advance in order to enable communication, which operation the user should perform, etc.

Further, there is a case where a user is confused about whether or not to perform the touch operation using the NFC compatible device because it is hard to recognize the position where the NFC reader/writer is arranged in the image forming apparatus, or it is not possible to immediately grasp the fact that the NFC reader/writer is installed.

The above-described problem also applies similarly to the case where user authentication is performed by means of the technique of card authentication or biometric authentication, in addition to the case of user authentication using an NFC compatible device.

In particular, with an apparatus capable of multi-login by a plurality of users, each user has the above-described problem of confusion, and besides that, it is necessary to make adjustment between users in order to solve the problem.

SUMMARY OF THE INVENTION

The apparatus according to the present invention is an apparatus capable of multi-login that allows a plurality of users to simultaneously log in and the apparatus includes: a guidance display unit configured to indicate the position where a predetermined user's operation for login should be performed by lighting; a human sensor configured to detect a person who exists within a predetermined range of the apparatus; and a control unit configured to control the lighting of the guidance display unit in accordance with whether the setting of the multi-login is effective or ineffective. In the case where a user in the login state exists, the control unit: controls, on a condition that the multi-login is set to be ineffective, the guidance display unit to turn its light off regardless of whether or not a person is detected by the human sensor; and controls, on a condition that the multi-login is set to be effective, the guidance display unit to turn its light on when a person is detected by the human sensor and controls the guidance display unit to turn its light off when no person is detected by the human sensor.

Further features of the present invention will become apparent from the following description of exemplary embodiments (with reference to the attached drawings).

BRIEF DESCRIPTION OF THE DRAWINGS

FIG. 5 is a diagram showing a relationship of FIGS. 5A and 5B;

FIGS. 5A and 5B are flowcharts showing a flow of control processing of the above-described operation mode in the image forming apparatus according to the first embodiment;

FIGS. 12A to 12D are diagrams each showing an example of a guidance display in each operation mode of the image forming apparatus in the case where the multi-login is set to be ineffective according to the first embodiment;

FIGS. 13A to 13C are diagrams each showing an example of a guidance display in each operation mode of the image forming apparatus in the case where the multi-login is set to be effective according to the first embodiment;

FIG. 14 is a table putting together the lit state/the unlit state for each condition of an NFC LED and a power-saving LED according to the first embodiment;

FIG. 25 is a table putting together the lit state/the unlit state for each condition of a card reader LED, an NFC LED, and a power-saving LED according to the second embodiment.

DESCRIPTION OF THE EMBODIMENTS

In the following, with reference to the attached drawings, the present invention is explained in detail based on preferred embodiments. Configurations shown in the following embodiments are merely exemplary and the present invention is not limited to the configurations shown schematically.

First Embodiment

Figure 1A:
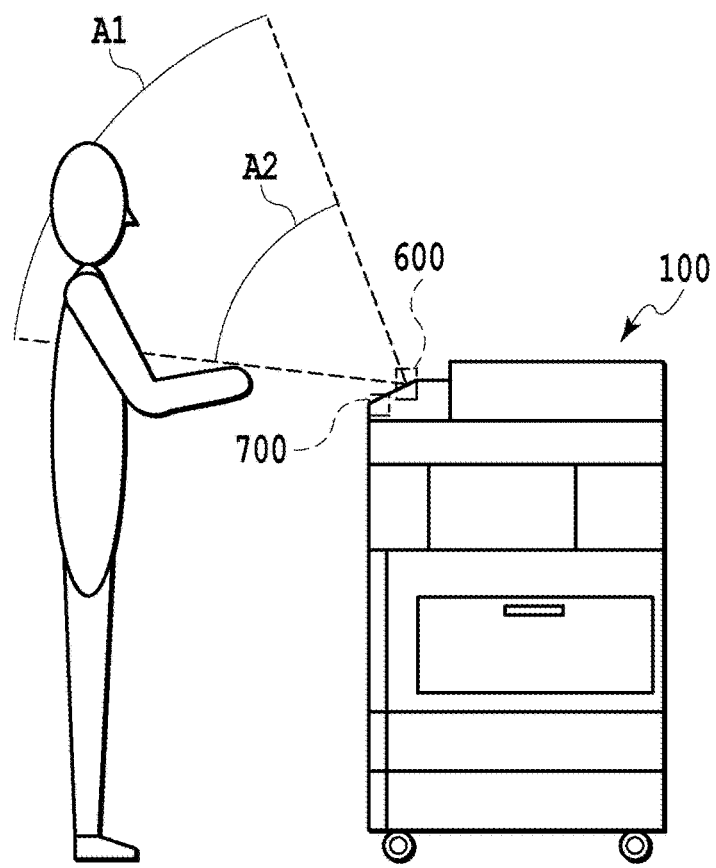
FIGS. 1A and 1B are external views showing an image forming apparatus and a user who uses the image forming apparatus.
Figure 1B:
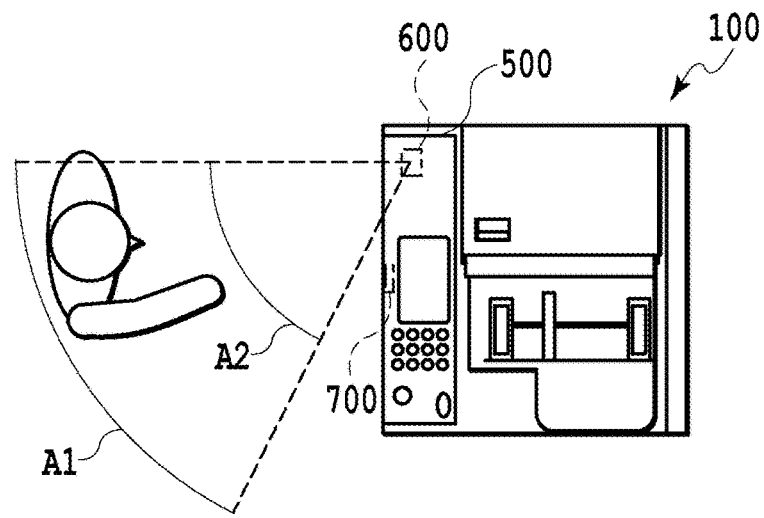

FIGS. 1A and 1B are external views showing an image forming apparatus capable of multi-login and a use who uses the image forming apparatus, and FIG. 1A is a diagram viewed from the side and FIG. 1B is a diagram viewed from the top.

An image forming apparatus 100 is an MFP (Multi Function Peripheral) including a plurality of functions, such as a print function, a scanner function, a copy function, and a FAX function. Here, multi-login is reviewed. In the multi-login environment, while the login state of a user who has already logged in to the image forming apparatus 100 is being maintained, another user is allowed to simultaneously log in to the image forming apparatus 100. Consequently, in the multi-login environment, it is possible for a plurality of users to perform jobs, such as printing, while sharing each user's knowledge (e.g., document data saved in the image forming apparatus) by simultaneously making use of the image forming apparatus 100. Further, the image forming apparatus 100 includes a human sensor unit 600 configured to detect a person who is approaching the apparatus. In the case where the human sensor unit 600 detects a person who is approaching, the image forming apparatus 100 returns from the power-saving mode in which power consumption is suppressed to the power state where one of the above-described plurality of functions can be used.

The human sensor unit 600 is, for example, an infrared array sensor, and is capable of detecting the distance between the position of a person and the image forming apparatus 100 based on the distribution of the received infrared light intensity by receiving the infrared light that is radiated due to the body temperature of a person with light reception units arranged in the form of a line or matrix.

Then, it is possible for the human sensor unit 600 of the present embodiment to detect a person who exists within a predetermined range of the image forming apparatus 100 in two stages of distance. In other words, the human sensor unit 600 has detection ranges in two stages: an external detection area A1 and an internal detection area A2. Due to the detection areas in two stages, a state where a user is detected in a position distant from the image forming apparatus 100 is distinguished from a state where a user is detected in a position close to the image forming apparatus 100. The human sensor unit 600 is arranged so that the detection area is located above, and therefore, it is possible for the human sensor unit 600 to detect a person without the influence of an obstacle, such as a computer placed on a desk. The number of stages of the detection area does not necessarily need to be two. In the case of two stages, it is possible to bring an NFC unit 700 or the like into the operable state or to cause an NFC LED 711 to turn on (blink) by detecting a person in the external detection area A1 distant from the image forming apparatus 100 before releasing the power-saving mode by detecting a person in the internal detection area A2 close to the image forming apparatus 100. In the case of one stage, the timing at which the power-saving mode is released by detecting a person is the same as the timing at which the NFC unit 700 or the like is brought into the operable state or the NFC LED 711 is caused to turn on (blink). Further, the sensor may be arranged so as to face the front or downward, in addition to upward.

Further, the image forming apparatus 100 includes the NFC unit 700 having an antenna for communicating with external equipment by using the near field communication (NFC) system. For example, the NFC unit 700 includes a reader function to read information on an NFC compatible device (NFC compatible authentication card or the like) that is held above the NFC unit 700. Further, the NFC unit 700 also has a writer function to write IP address information, data, etc., of the image forming apparatus 100 to NFC compatible mobile equipment, such as a smart phone, which is held above the NFC unit 700. In the present embodiment, the NFC unit 700 is incorporated in an operation unit 500 of the image forming apparatus 100, but the NFC unit 700 may be arranged in any position of the image forming apparatus 100 where it is easy for a user to perform the touch operation.

Figure 2:
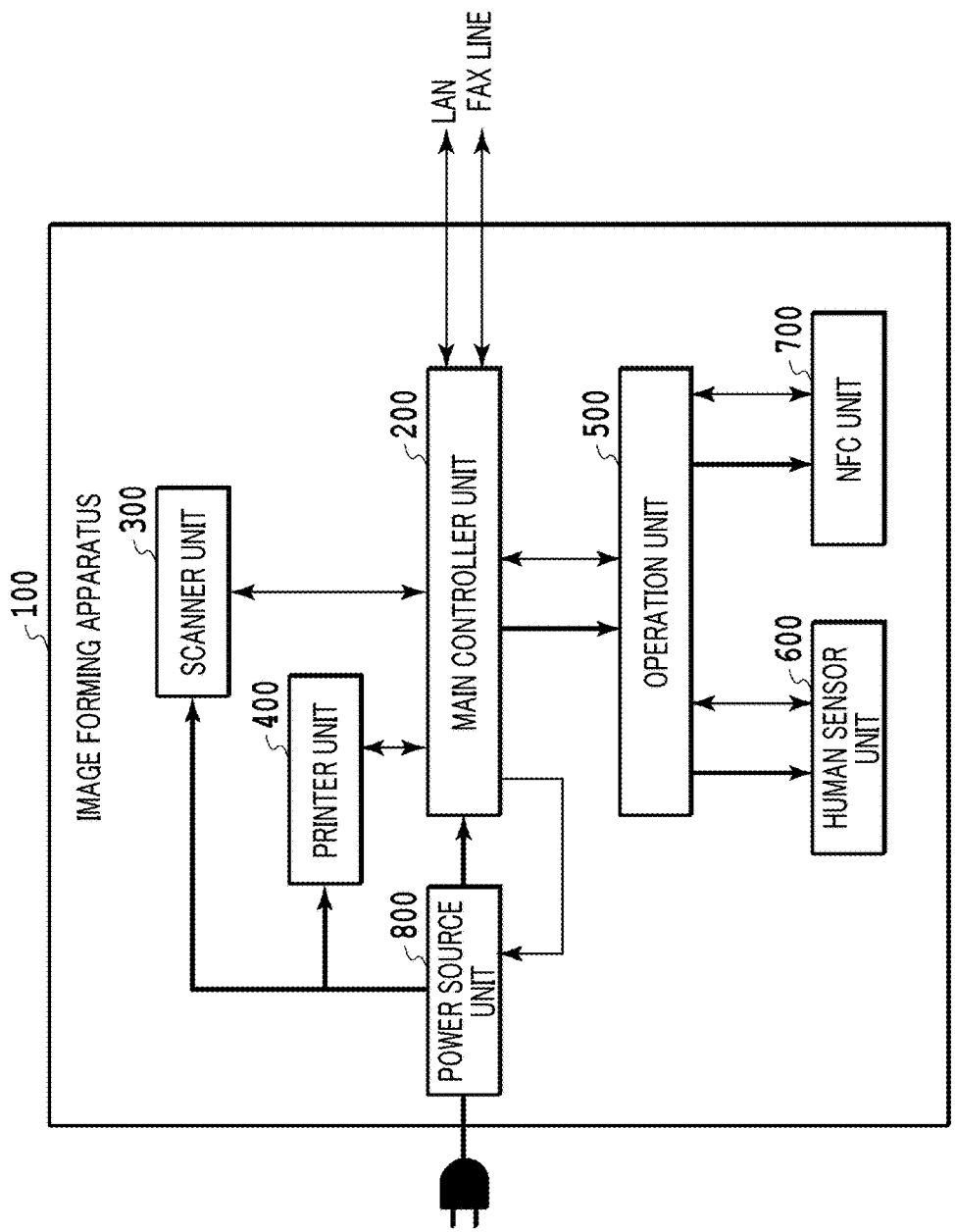
FIG. 2 is an outline function block diagram of an image forming apparatus according to a first embodiment.
Figure 3:
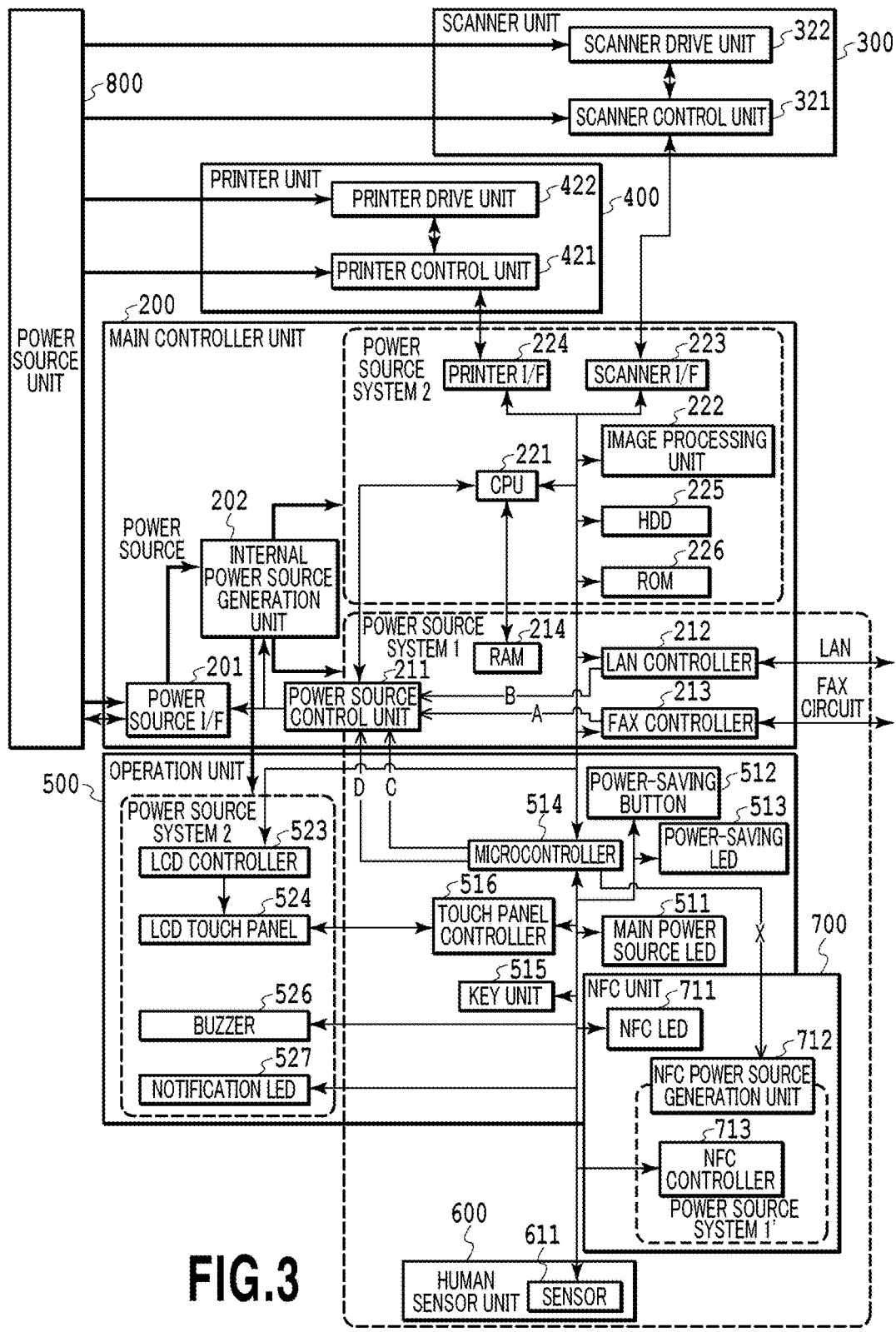
FIG. 3 is a detailed function block diagram of the image forming apparatus according to the first embodiment.

FIG. 2 is a simplified function block diagram of the image forming apparatus 100 according to the present embodiment. The image forming apparatus 100 includes a main controller unit 200, a scanner unit 300, a printer unit 400, the operation unit 500, the human sensor unit 600, the NFC unit 700, and a power source unit 800. FIG. 3 is a block diagram showing details of each component (function unit) shown in FIG. 2. In the following, each component is explained with reference to FIG. 2 and FIG. 3.

The main controller unit 200 generates print image data to be used in the printer unit 400 by performing processing on image data that is input from the scanner unit 300 or the like, and centralizedly controls each unit, such as the scanner unit 300 and the printer unit 400, in response to user's instructions that are input to the operation unit 500. Further, the main controller unit 200 controls the power mode of the image forming apparatus 100 by controlling the power source unit 800.

The main controller unit 200 is separated into at least two power source systems: a power source system 1 that is required to operate also in the power-saving mode and a power source system 2 that is not required to operate in the power-saving mode. To the power source system 1, power is supplied at all times by an internal power source generation unit 202 having received the supply of power source from a power source I/F 201. To the power source system 1, a power source control unit 211, a LAN controller 212, and a FAX controller 213 are connected so that it is possible to respond to the case where a FAX is received or a print request is made from a network even in the power-saving mode of the apparatus. To the power source system 2, a ROM 226 that is necessary at the time of activation, an image processing unit 222 that is necessary at the time of the copy operation, a scanner I/F 223, a printer I/F 224, and an HDD 255 are connected and no power is supplied in the power-saving mode. In the case where one of interrupt signals A to D is input from each unit that is connected to the power source control unit 211 in the power-saving mode, the power source control unit 211 releases the power-saving mode by controlling the internal power source generation unit 202 to supply power to the power source system 2. Here, the interrupt signal is explained.

The interrupt signal A is a signal that is output from the FAX controller 213 and is output in the case where a FAX is received from a FAX line.

The interrupt signal B is a signal that is output from the LAN controller 212 and is output in the case where a print job packet or state check packet is received.

The interrupt signals C and D are signals that are output from a microcontroller 514 inside the operation unit 500 and details will be described later. The microcontroller 514 is a microcontroller in which a processor, a memory, an input/output circuit, a timer circuit, etc., are stored in one integrated circuit.

In the case where power is supplied also to the power source system 2 inside the main controller 200 by the interrupt signals A to D, the state information is read from the RAM 214 that has been self-refreshing in the power source system 1 in order to return the apparatus into the state (normal power mode) before the transition into the power-saving mode. After the image forming apparatus 100 returns to the normal power mode, processing in accordance with the return factor of the interrupt signals A to D is performed by a CPU 221.

The scanner unit 300 generates image data by optically reading a document that is set on a document table, not shown. The scanner unit 300 consists of a scanner control unit 321 and a scanner drive unit 322. The scanner drive unit 322 includes a drive unit configured to move a read head for reading a document, a drive unit configured to convey a document as far as a read position, etc. The scanner control unit 321 acquires scan setting information that is set by a user from the main controller unit 200 and controls the operation of the scanner drive unit 322 based on the acquired scan setting information.

The printer unit 400 forms an image on a printing medium (sheet) in accordance with, for example, the electrophotographic system. The printer unit 400 consists of a printer control unit 421 and a printer drive unit 422. The printer drive unit 422 includes a motor for rotating a photoconductor drum, a mechanism unit configured to apply pressure to a fixing unit, a heater, etc. The printer control unit 421 acquires print setting information that is set by a user from the main controller unit 200 and controls the operation of the printer drive unit 422 based on the acquired print setting information.

The operation unit 500 has an LCD touch panel 524 that is obtained by integrating an LCD panel and a touch panel into one unit, a key unit 515 configured to detect the key operation of a user, such as the ten-key operation and the start key operation, and a buzzer 526. On the LCD touch panel 524, image data that is received by an LCD controller 523 from the main controller 200 is drawn. In the case where a user touches and operates on the screen of the LCD touch panel 524, a touch panel controller 516 analyzes the data of the coordinates of the touched portion and notifies the microcontroller 514 of the analysis results, and the microcontroller 514 notifies the CPU 221 of the analysis results. The microcontroller 514 periodically checks the key operation performed to the key unit 515 and in the case where there is a key operation by a user, the microcontroller 514 notifies the CPU 221 of the key operation. Upon receipt of the notification to the effect that there has been an input operation to the LCD touch panel 524 or the key unit 515, the CPU 221 causes the image forming apparatus 100 to operate in accordance with the contents of the operation. Further, in the operation unit 500, a plurality of LEDs is incorporated. A main power source LED 511 is an LED that is always kept in the lit state while the main power source of the image forming apparatus 100 is in the turned-on state. A notification LED 527 is controlled by the microcontroller 514 and notifies a user of the state of the image forming apparatus 100, such as the state where a job is being performed and the state where an error has occurred.

Then, the inside of the operation unit 500 is also separated into at least two power source systems: the power source system 1 that is required to operate also in the power-saving mode and the power source system 2 that is not required to operate in the power-saving mode. The power source system 1 includes the microcontroller 514, the main power source LED 511, a power-saving button 512, the touch panel controller 516, and the key unit 515, and power is supplied at all times by the internal power source generation unit 202 having received the supply of power source from the power source I/F 201. The power source system 2 includes the LCD controller 523, the LCD touch panel 524, the buzzer 526, and the notification LED 527 and the supply of power source is cut off in the power-saving mode.

The human sensor unit 600 is included in the power source system 1 and receives the supply of power at all times, and therefore, it is possible for the human sensor unit 600 to detect the movement of a person also in the power-saving mode. By the microcontroller 514 periodically receiving a detection signal from a sensor 611 and performing processing on the detection signal, the movement of a person is detected.

The NFC unit 700 includes the NFC LED 711, an NFC power source generation unit 712, and an NFC controller 713. The NFC controller 713 switches between the reader function and the writer function at intervals of hundreds of milliseconds and reads or writes information (data) from or to an NFC compatible device that is held above an antenna unit (not shown). The NFC power source generation unit 712 generates power for the NFC unit 700 to operate. In the case where the image forming apparatus 100 is in the power-saving mode, the generation of power in the NFC power source generation unit 712 is stopped, and therefore, the NFC controller 713 also does not operate.

Subsequently, the transition of the operation mode (power mode) in the image forming apparatus 100 is explained.

Figure 4:
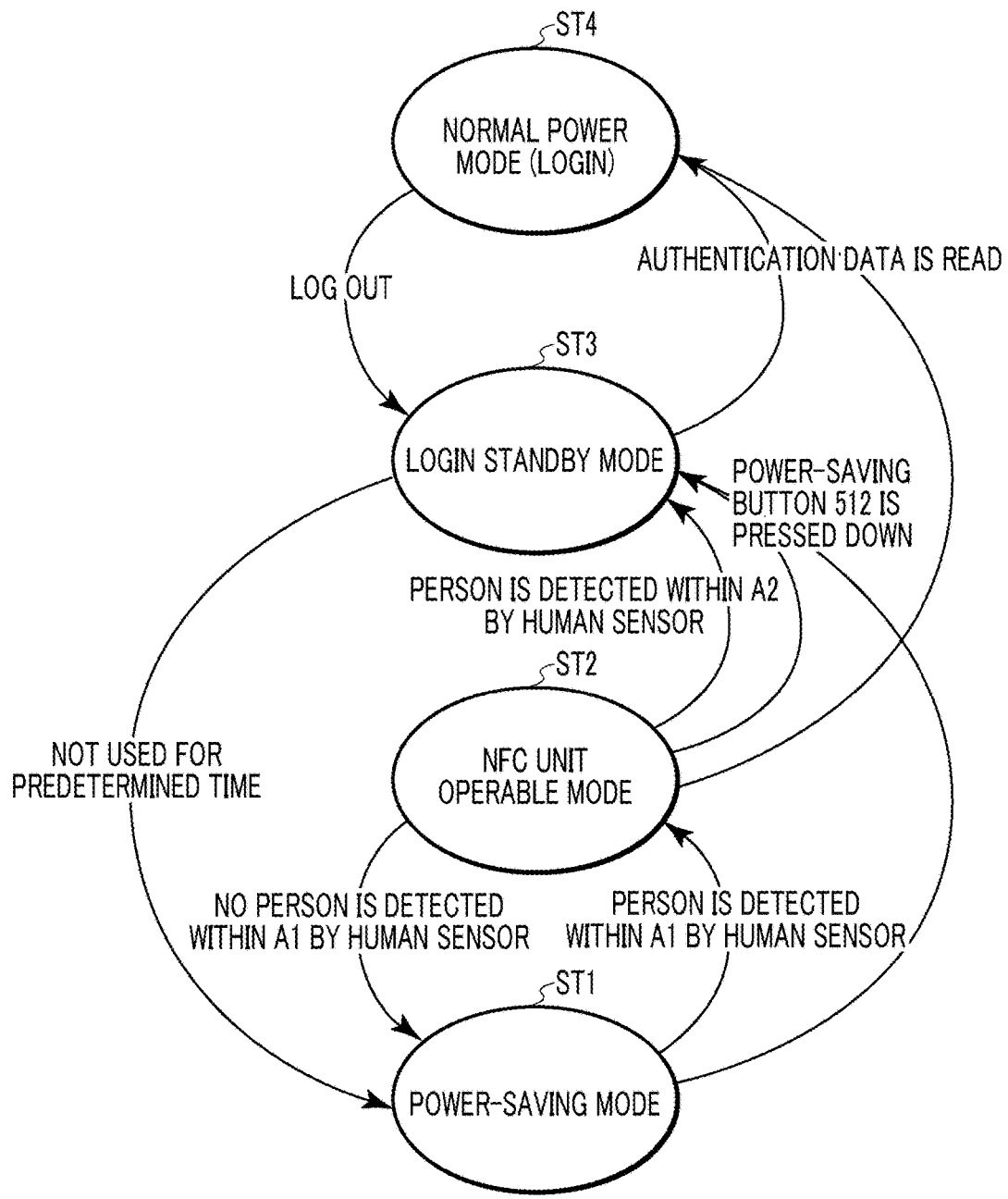
FIG. 4 is a transition diagram of the operation mode of the image forming apparatus according to the first embodiment.

FIG. 4 is a transition diagram of the operation mode of the image forming apparatus 100 according to the present embodiment. The operation mode of the image forming apparatus 100 is roughly divided into a normal power mode (ST4) in which the copy operation or the like can be performed and a power-saving mode (ST1) in which power consumption is lower than that in the normal power mode.

Then, between the normal power mode (ST4) and the power-saving mode (ST1), there further exist two operation modes, i.e., an NFC unit operable mode (ST2) and a login standby mode (ST3), as intermediate states. These power modes are controlled by the main controller unit 200 controlling the power source unit 800. In the power-saving mode, the supply of power source to the scanner unit 300, the printer unit 400, etc., is stopped and the power source is supplied only to the inside of the main controller unit 200, the inside of the operation unit 500, and the human sensor unit 600.

Figure 5B:
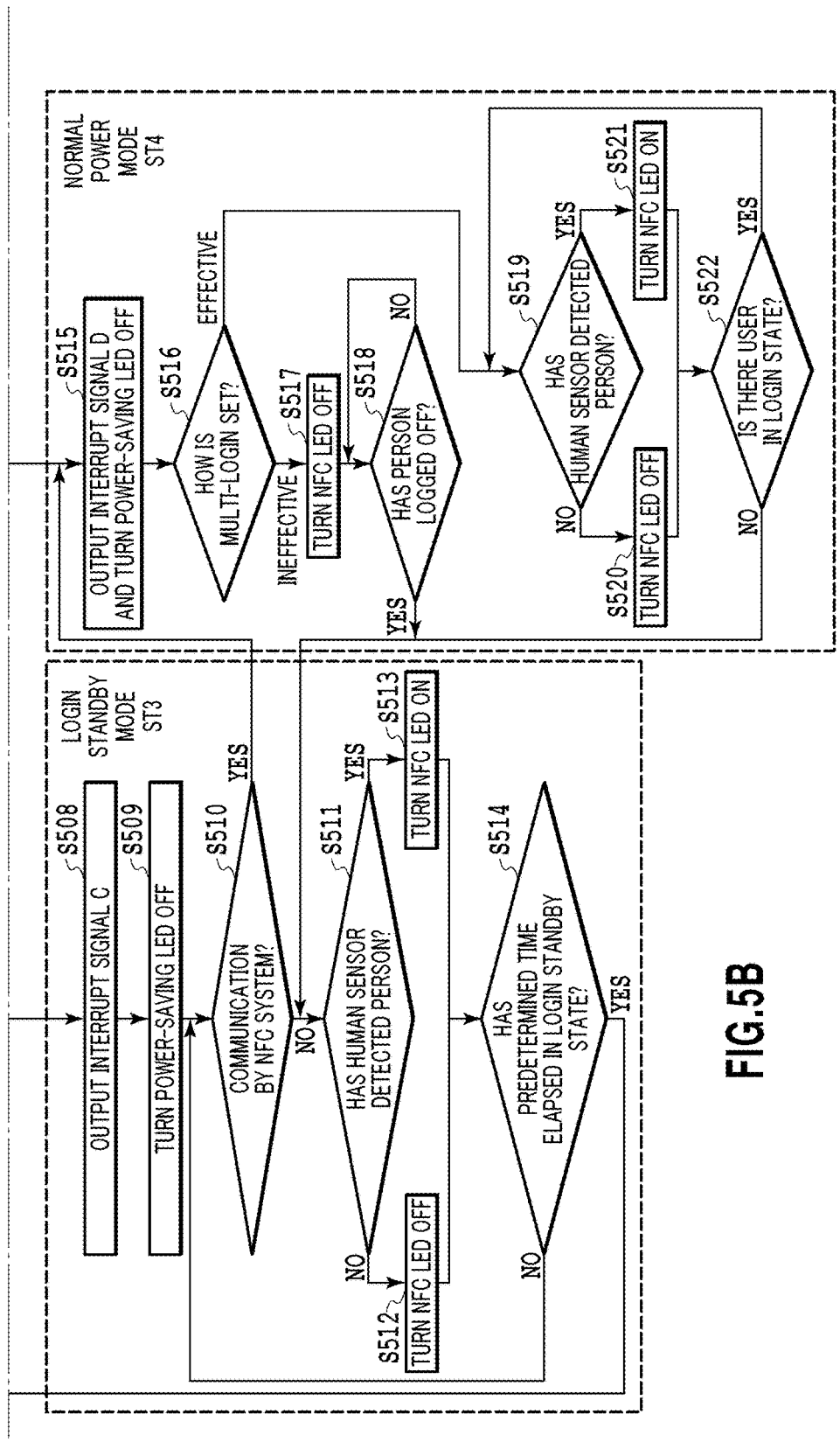

FIGS. 5A and 5B are flowcharts showing a flow of the control processing of the above-described operation mode in the image forming apparatus 100 according to the present embodiment. The series of processing shown in this flow is implemented by the processor within the microcontroller 514 executing control programs stored in the memory. In the following, the transition of the operation mode of the image forming apparatus 100 is explained in detail along with the flowcharts in FIGS. 5A and 5B.

Figure 6:
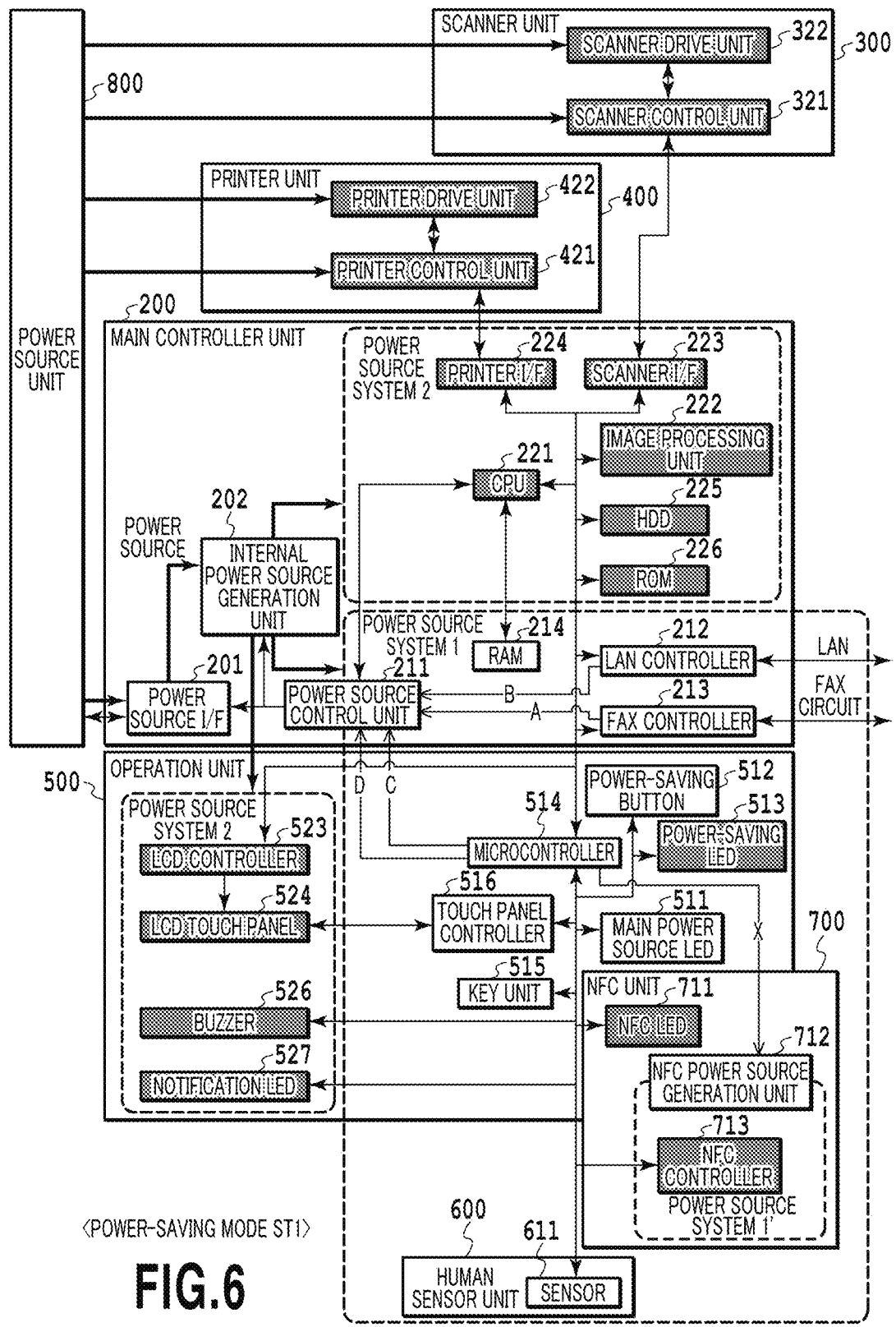
FIG. 6 is a diagram showing a state where power is supplied to each unit constituting the image forming apparatus in a power-saving mode of the first embodiment.

At step 501 in the power-saving mode (ST1), the microcontroller 514 periodically receives the detection signal from the human sensor unit 600 and determines whether a person has been detected within the external detection area A1 or the internal detection area A2. FIG. 6 is a diagram showing a state where power is supplied to each unit constituting the image forming apparatus 100 in the power-saving mode of the present embodiment. In FIG. 6, the gray portion indicates a portion to which the supply of power is stopped. In the case where a person is detected by the human sensor unit 600 in the power-saving mode, the processing proceeds to step 503. In other words, the processing proceeds to the processing to move the mode into the NFC unit operable mode (ST2). On the other hand, in the case where a person is not detected (including the case where a person who has been existing within the external detection area A1 disappears), the processing proceeds to step 502.

At step 502, the microcontroller 514 stops the generation of power source in the case where the power source is generated by the NFC power source generation unit 712. As shown in FIG. 6, in the power-saving mode, power is not supplied to the NFC controller unit 712, and therefore, the NFC unit 700 is in the inoperable state. In order to notify a user of this fact, the NFC LED 711 (and a power-saving LED 513) is brought into the unlit state. Here, the lit state of the NFC LED 711 means a guidance display that shows a user the portion above the apparatus where the user should hold external equipment, such as an NFC compatible device, and the unlit state thereof shows a state where the communication by external equipment, such as an NFC compatible device, cannot be performed. Further, the lit state of the power-saving LED 513 means a guidance display that shows a user the position of an instruction unit, such as a button, configured to release the power-saving mode, and the unlit state thereof shows that a user's operation to return the apparatus from the power-saving mode is not necessary.

At step 503, the microcontroller 514 causes the power-saving LED 513 to turn on (to blink in the present embodiment) and at the same time, outputs an energization request signal X to the NFC power source generation unit 712. Upon receipt of the energization request signal X, the NFC power source generation unit 712 generates power and starts the supply of power source to the NFC controller 713. Due to this, the NFC unit 700 is brought into the state where the operation (communication by the NFC system) can be performed.

Figure 7:
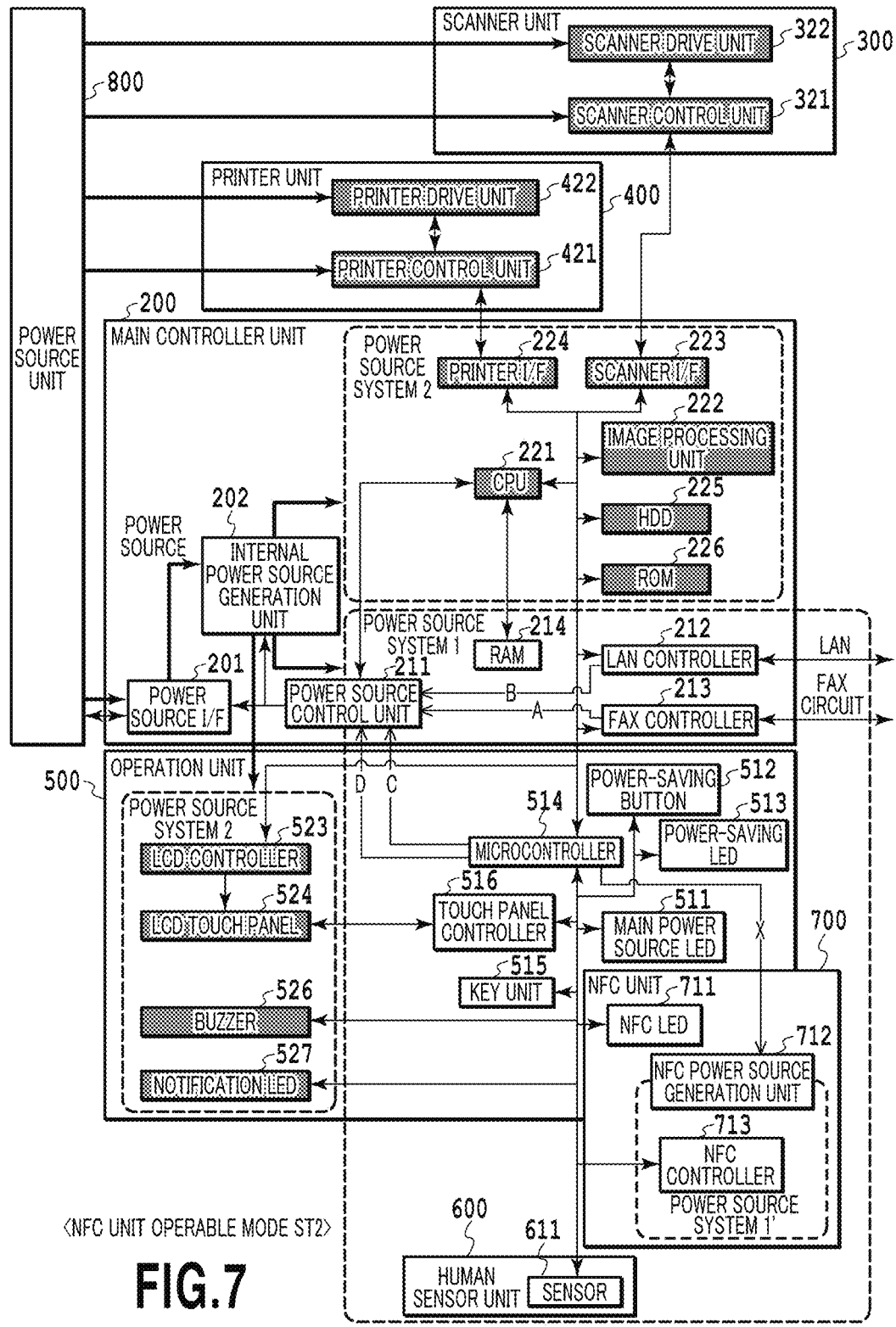
FIG. 7 is a diagram showing a state where power is supplied to each unit constituting the image forming apparatus in an NFC unit operable mode of the first embodiment.

At step 504 that follows, the microcontroller 514 checks that the NFC controller 713 has activated and the NFC unit 700 has become operable, and then causes the NFC LED 711 to turn on (to blink in the present embodiment). Due to this, the transition into the NFC unit operable mode (ST2) is completed. FIG. 7 is a diagram showing a state where power is supplied to each unit constituting the image forming apparatus 100 in the NFC unit operable mode of the present embodiment. By a comparison with FIG. 6, it is known that the power-saving LED 513, the NFC LED 711, and the NFC controller 713 are no longer gray, which means that power is supplied thereto in FIG. 7.

At step 505, the microcontroller 514 determines whether the communication by the NFC system has been performed (whether, an NFC compatible device has been held above the NFC unit 700). Here, the fact that the communication by the NFC system has been performed means that, for example, a user's operation for login (user authentication) using an NFC compatible authentication card has been performed. Of course, the user's operation may be performed by using a smart phone in which ID information or the like for user authentication is stored, not limited to an authentication card. In the case where the communication by the NFC system has been performed, the processing proceeds to step 515 and the mode moves into the normal power mode (ST4). On the other hand, in the case where the communication by the NFC system has not been performed, the processing proceeds to step 506.

At step 506, the microcontroller 514 determines whether a person has been detected within the range of the internal detection area A2. In the case where a person has been detected within the range of the internal detection area A2, the processing proceeds to step 507. On the other hand, in the case where no person has been detected within the range of the internal detection area A2, the processing returns to step 501.

At step 507, the microcontroller 514 determines whether a predetermined period of time (e.g., 0.5 sec) has elapsed with the state where a person has been detected within the range of the internal detection area A2 being kept. Here, the predetermined period of time is arbitrary, and a user or the like may set and hold the predetermined period of time in advance in the RAM or the like. In the case where the results of the determination indicate that the predetermined period of time has elapsed with the state where a person has been detected within the range of the internal detection area A2 being kept, the processing proceeds to step 508. On the other hand, in the case where a person is no longer detected within the range of the internal detection area A2 before the predetermined period of time elapses, the processing returns to step 505. In the present embodiment, in order to simplify the processing flow, after a person is detected within the range of the internal detection area A2, whether the detected state is maintained for the predetermined period of time is determined. Such determination processing is implemented specifically as follows. First, in the stage where a person has been detected by the human sensor and the processing proceeds to step 503, a variable N used for elapsed time measurement processing is initialized (N=0), and then processing to wait for a predetermined period of time (e.g., 100 msec) is performed before the determination processing at step 505. Then, in the stage where it is determined that a person has been detected within the range of the internal detection area A2 (Yes at step 506), the variable N is incremented (+1) and subsequently, whether the value of the variable N is equal to or greater than a threshold value (e.g., 5) is determined. In the case where the results of the determination indicate that the value of the variable N is less than the threshold value, the processing returns to the above-described wait processing and the processing is continued. Then, in the stage where the value of the variable N has become equal to or greater than the threshold value, it is sufficient to determine that the predetermined period of time has elapsed with the state where a person has been detected within the range of the internal detection area A2 being kept.

At step 508, the microcontroller 514 outputs the interrupt signal C to the power source control unit 211. The power source control unit 211 having received the interrupt signal C supplies power to the power source system 2 of the main controller unit 200, the power source system 2 of the operation unit 500, the scanner control unit 321, and the printer control unit 421. The CPU 221 that has activated upon receipt of the supply of power restores the state stored within the RAM 214 and moves the mode from the NFC unit operable mode (ST2) into the login standby mode (ST3). In each of the power-saving mode (ST1) and the NFC unit operable mode (ST2), regardless of the detection of a person by the human sensor unit 600, it is possible to move the mode into the login standby mode (ST3) by outputting the interrupt signal C in accordance with the pressing-down of the power-saving button 512, the touch operation to the LCD touch panel 524, and the pressing-down of the key unit 515.

Figure 8:
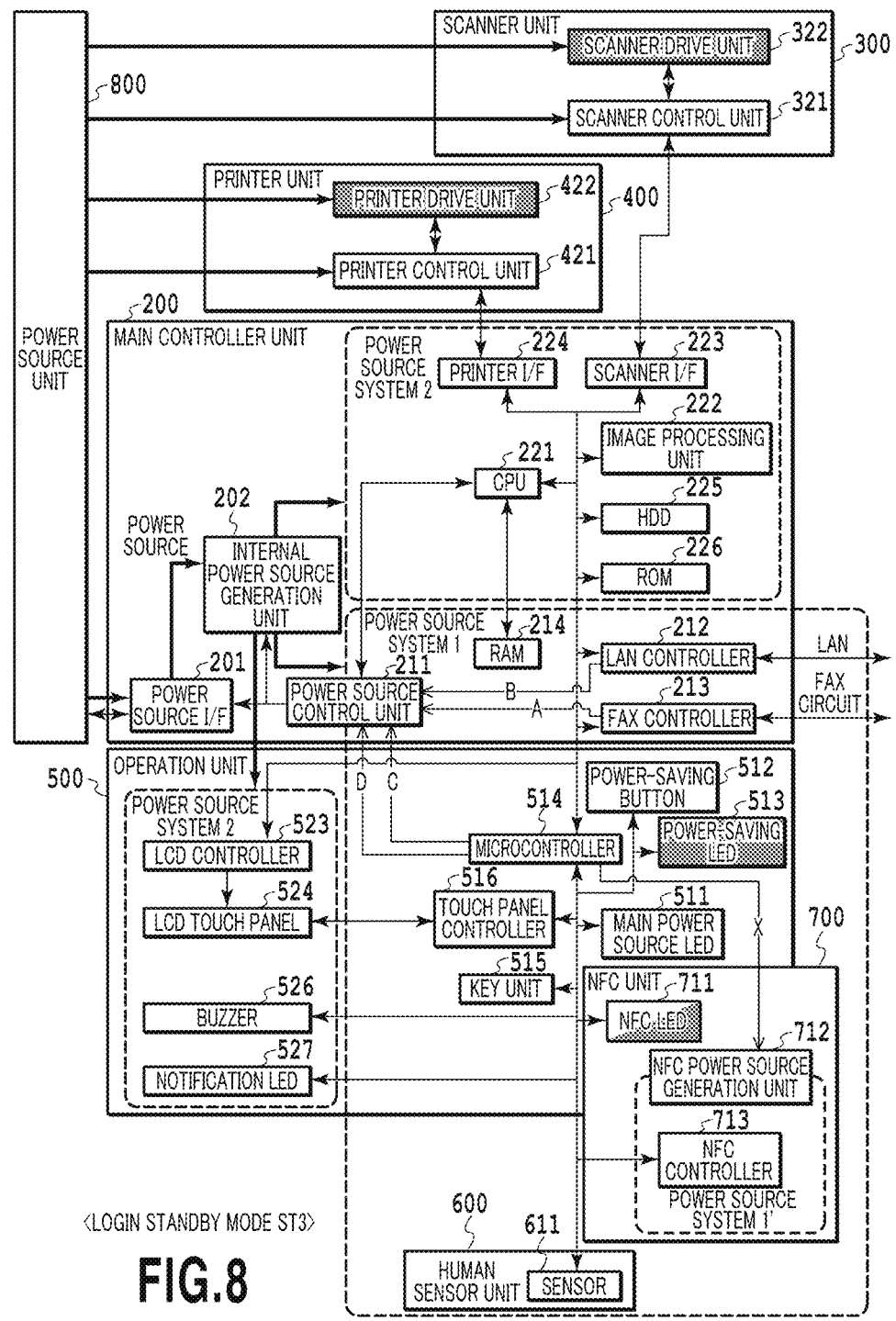
FIG. 8 is a diagram showing a state where power is supplied to each unit constituting the image forming apparatus in a login standby mode of the first embodiment.

At step 509, the microcontroller 514 turns the power-saving LED 513 off. In the login standby mode (ST3), the power-saving LED 513 is always in the unlit state. FIG. 8 is a diagram showing a state where power is supplied to each unit constituting the image forming apparatus 100 in the login standby mode of the present embodiment. In FIG. 8, among the portions to which the supply of power is stopped, the power source system 2, the scanner control unit 321 within the scanner unit 300, and the printer control unit 421 within the printer unit 400 are no longer gray, which means that power is supplied thereto in FIG. 8. Half of the NFC LED 711 is shown in gray and this means that the lit state/the unlit state are switched depending on whether a person is detected by the human sensor unit 600.

At step 510, the microcontroller 514 determines whether the communication by the NFC system has been performed (whether an NFC compatible device has been held above the NFC unit 700). In the case where the communication by the NFC system has been performed, the processing proceeds to step 515 and the mode moves into the normal power mode (ST4). On the other hand, in the case where the communication by the NFC system has not been performed, the processing proceeds to step 511. The meaning of the fact that the communication by the NFC is performed is the same as that explained at step 505.

At step 511, the microcontroller 514 determines whether a person has been detected in one of the external detection area A1 and the internal detection area A2 of the human sensor unit 600. This determination processing is the same as that at step 501 described above. In the case where a person has been detected within the external detection area A1 or the internal detection area A2, the processing proceeds to step 513. On the other hand, in the case where no person has been detected, the processing proceeds to step 512.

At step 512, the microcontroller 514 turns the NFC LED 711 off.

At step 513, the microcontroller 514 turns the NFC LED 711 on (in the present embodiment, the NFC LED 711 is caused to blink).

At step 514, the microcontroller 514 determines whether a predetermined period of time (e.g., 30 sec) has elapsed without any operation being performed by a user in the login standby mode. Here, the predetermined period of time may be arbitrary and a user or the like may set and hold the predetermined period of time in advance in the RAM or the like. In the case where the results of the determination indicate that the predetermined period of time has elapsed with the login standby state being kept, the processing returns to step 501. Due to this, the mode will move into the power-saving mode (ST1). On the other hand, in the case where the predetermined period of time has not elapsed, the processing returns to step 510 and each piece of the processing in the login standby mode is continued. In other words, for the predetermined period of time after the login standby mode has been entered, the NFC LED 711 is in the lit (blinking) state in the case where there is a person in front of the image forming apparatus 100, and in the unlit state in the case where there is no person. The NFC controller 713 is always in the operable state in the login standby mode. In this manner, a user is notified that the operation to press down the power-saving button 512 is not necessary by the unlit state of the power-saving LED 513 and that the NFC unit 700 is operable by the lit state of the NFC LED 711 in the login standby mode (ST3). In the present embodiment, power is not supplied to the scanner drive unit 322 within the scanner unit 300 and the printer drive unit 422 within the printer unit 400 in the login standby mode (see FIG. 8), and therefore, it is possible to suppress the power consumption of the image forming apparatus 100 until the point in time immediately before the use by a user. As a matter of course, it may also be possible to bring the two drive units described above into the energized state.

In the case where an NFC compatible device is held above the NFC unit 700 (the communication by the NFC system is performed) in one of the NFC unit operable mode (ST2) and the login standby mode (ST3), the microcontroller 514 outputs the interrupt signal D at step 515. Further, the microcontroller 514 turns the power-saving LED 513 off. The power source control unit 211 having received the interrupt signal D outputs an authentication request notification to the CPU 221 after resuming the supply of power source to the power source system 2 in the case where the supply of power source in the power source system 2 is stopped. Upon receipt of the authentication request notification, the CPU 221 performs user authentication processing and moves the image forming apparatus 100 into the normal power mode (ST4). Although omitted in the present flow, in the case where it is determined that a user is not an authorized user by the user authentication processing, it may be possible to perform processing to, for example, move the mode into (to maintain) the login standby mode (ST3) after displaying a message or the like to that effect on the screen of the operation unit 500.

Figure 9:
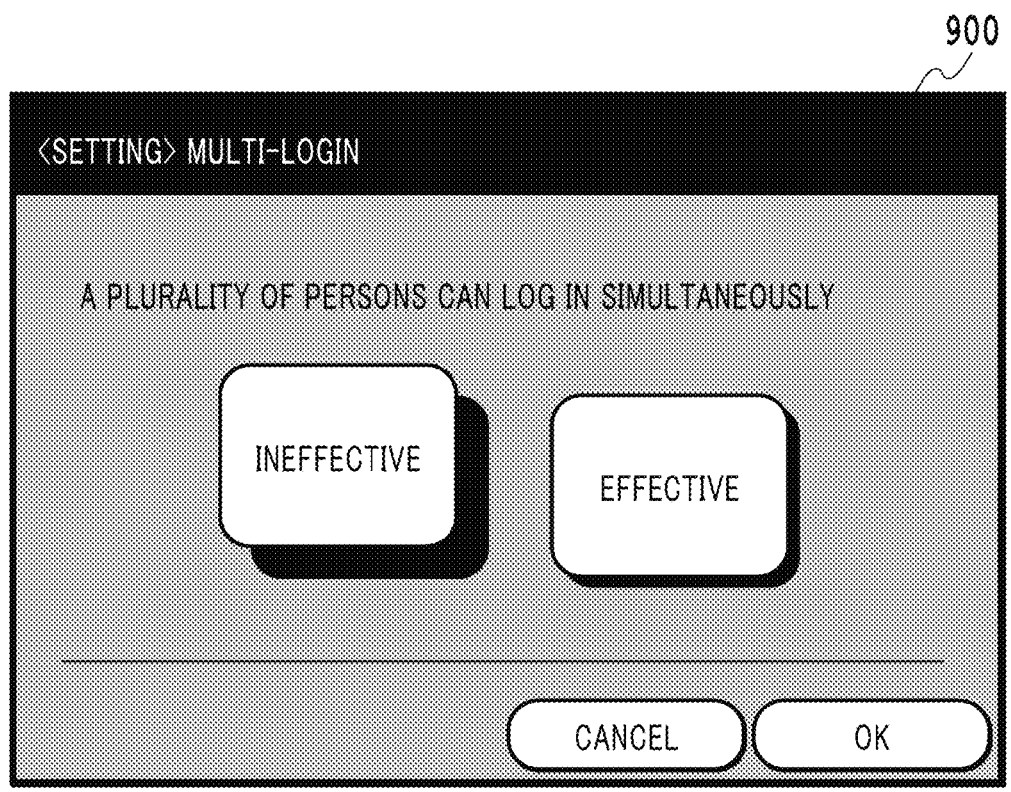
FIG. 9 is a diagram showing an example of a setting screen for a user to perform a multi-login setting.
Figure 10:
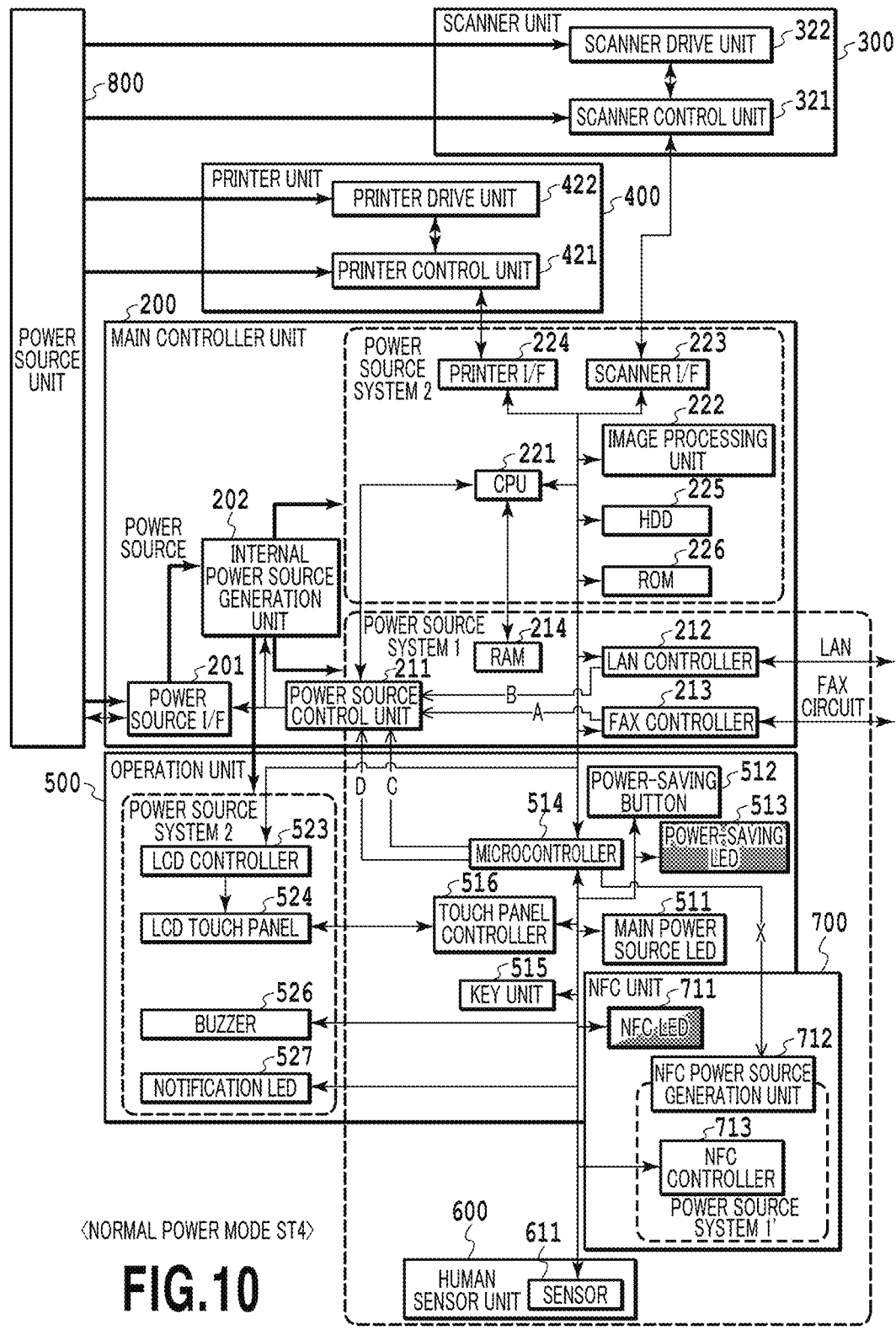
FIG. 10 is a diagram showing a state where power is supplied to each unit constituting the image forming apparatus in a normal power mode of the first embodiment.

At step 516 in the normal power mode (ST4), the microcontroller 514 determines whether the setting of multi-login is effective or ineffective. FIG. 9 is a diagram showing an example of a setting screen for a user to set multi-login. By pressing down an "OK" button after selecting an "Effective" button in the case where it is desired to bring about a state where multi-login is possible, or selecting an "Ineffective" button in the case where it is desired to bring about a state where multi-login is not possible on a multi-login setting screen 900 shown in FIG. 9, the multi-login setting is set to be effective or ineffective. In the case where the multi-login is set to be effective via the multi-login setting screen 900 such as this, the processing proceeds to step 519. Step 519 to step 521 that follow correspond to step 511 to step 513 described above, respectively. In other words, in the case where multi-login is effective, the lit state/the unlit state of the NFC LED 711 are switched in accordance with whether a person has been detected by the human sensor unit 600. Although not shown in the flow, it may also be possible to bring the NFC LED 711 into the unlit state for a fixed period of time so that a user can recognize that he or she has logged in also by means of the NFC LED 711 in the case where the user logs in in the multi-login environment. Further, it may also be possible to bring the NFC LED 711 into the unlit state for a period of time until a user having logged in inputs a job or for a period of time until the user having logged in is no longer detected by the human sensor unit 600. FIG. 10 is a diagram showing a state where power is supplied to each unit constituting the image forming apparatus 100 in the normal power mode of the present embodiment. In FIG. 10, the power-saving LED 513 is gray indicating the power stopped state, but in the multi-login environment, the lit state/the unlit state of the NFC LED 711 are switched in accordance with whether a person has been detected by the human sensor unit 600, and therefore, half of the power-saving LED 513 is gray. On the other hand, in the case where the multi-login is set to be ineffective, the processing proceeds to step 517. The movement to step 517 means that just one user alone, who has cleared user authentication and has been allowed to log in, is making use of the image forming apparatus 100.

At step 517, the microcontroller 514 turns the NFC LED 711 off regardless of whether or not a person has been detected by the human sensor unit 600. Due to this, it is possible for a user who is trying to log in to recognize that login has been completed and that it is not necessary to hold an NFC compatible device (authentication card) for user authentication above the NFC unit 700. Further, it is possible for a user other than the user in the login state to recognize that there exists another user in the login state.

At step 518, the microcontroller 514 monitors whether the user (one user) has logged off and in the case where it is checked that the user has logged off, the processing proceeds to step 511 in the login standby mode (ST3).

At step 522 in the multi-login environment, the microcontroller 514 monitors whether there is a user in the login state. In the case where there is a user in the login state, the processing returns to step 519 and the processing is continued (the lit state/the unlit state of the NFC LED 711 are switched in accordance with whether a person has been detected by the human sensor unit 600). In the case where there is no user in the login state (in the case where it is checked that all the users have logged off), the processing proceeds to step 511 in the login standby mode (ST3). In other words, in the state where the multi-login is set to be effective, it is possible for a plurality of users to simultaneously log in and in the case where there is at least one user in the login state, the login standby state in the normal power mode is maintained without moving into the power-saving mode (ST1). In this case, in order to save power during standby, a method is considered in which, for example, whether or not a predetermined period of time has elapsed is checked for each user in the login state and the user for whom the predetermined period of time has elapsed is forced to log off. The predetermined period of time is arbitrary, and a user or the like may set and hold the predetermined period of time in advance in the RAM or the like. In the case where it is checked that all the users have logged off by methods including such a method, it is determined that there exists no user in the login state and the processing proceeds to step 511.

Figure 11A:
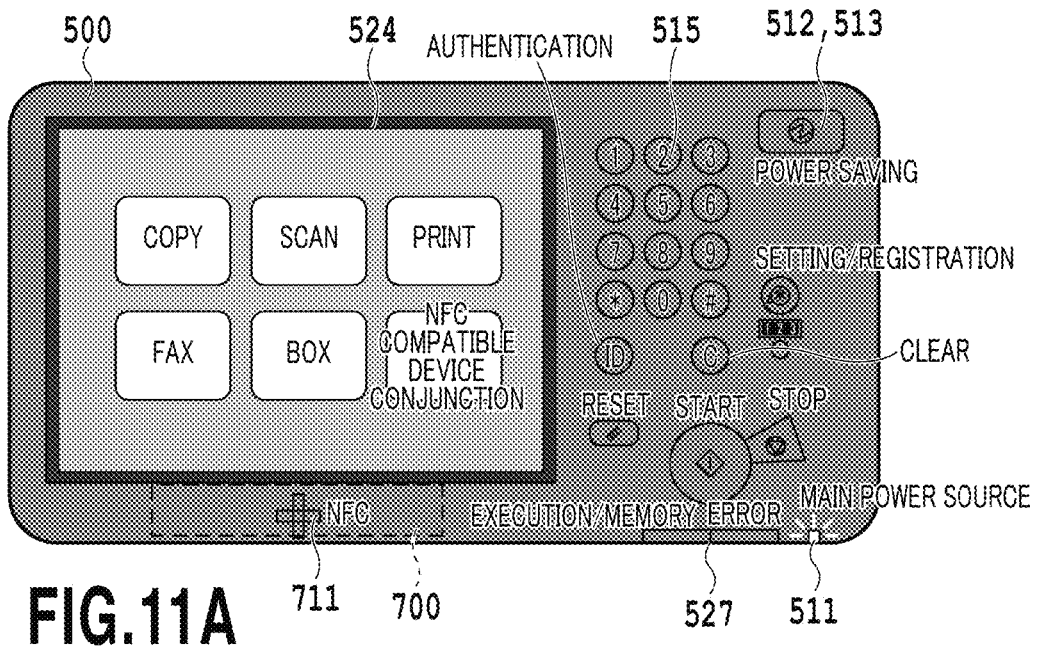
FIGS. 11A and 11B are diagrams showing an example of an operation unit according to the first embodiment.
Figure 11B:
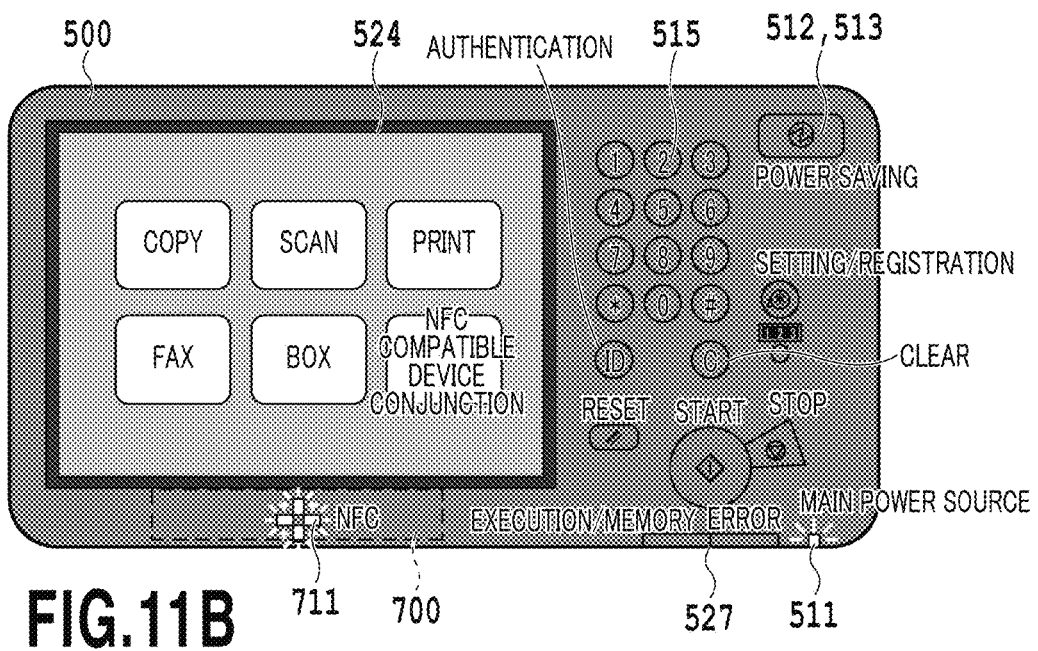

FIGS. 11A and 11B are diagrams each showing an example of the operation unit 500 according to the present embodiment. FIG. 11A shows the operation unit 500 in the case where the multi-login is set to be ineffective and there exists a user in the login state. On the other hand, FIG. 11B shows the operation unit 500 in the case where the multi-login is set to be effective state, there exists a user in the login state, and a person exists in front of the apparatus. First, common elements are explained. In either operation unit 500, the NFC unit 700 is arranged at the front side of the operation unit 500 so that it is easy for a user to perform the operation to touch an NFC compatible device to the NFC unit 700. The main power source LED 511 is controlled to be in the lit state at all times in the case where the main power source of the image forming apparatus 100 is in the turned-on state. The power-saving LED 513 is arranged under the power-saving button 512 (consisting of, for example, a milky white cover) and in the lit state, it seems that the whole of the power-saving button 512 is in the lit state. The notification LED 527 turns on while a job is being performed or in the case where an error has occurred. The NFC LED 711 is arranged at the center position of the antenna pattern of the NFC unit 700 and the center position of the portion at which the touch operation is performed is indicated as a mark by, for example, the cross of the milky white cover. The shape of the NFC LED 711 is required only to be a shape with which a user can recognize the portion at which an NFC compatible device is held above, and the shape may be, for example, a shape of the frame indicating the perimeter of the antenna, in addition to the cross.

Then, as shown in FIG. 11A, in the operation unit 500 in the case where the multi-login is set to be ineffective and there is a user in the login state, only the main power source LED 511 is in the lit state and the NFC LED 711 is in the unlit state. In contrast to this, in the operation unit 500 shown in FIG. 11B in the case where the multi-login is set to be effective and the human sensor unit 600 has detected a person, the NFC LED 711 is in the lit (blinking) state.

FIGS. 12A to 12D are diagrams each showing an example of a guidance display using an LED on the operation unit 500 in each operation mode of the image forming apparatus 100 in the case where the multi-login is set to be ineffective.

FIG. 12A shows a display state in the power-saving mode (ST1). The situation is such that there is no person in the external detection area A1 or in the internal detection area A2 of the human sensor unit 600 and only the main power source LED 511 is in the lit state.

FIG. 12B shows a display state in the NFC unit operable mode (ST2). The situation is such that a person has entered the external detection area A1 of the human sensor unit 600 and the power-saving LED 513 and the NFC LED 711 are in the lit (blinking) state. Due to this, there is produced a guidance effect of guiding the line of sight of a user toward the power-saving button 512 and the NFC unit 700.

FIG. 12C shows a display state in the login standby mode (ST3). The situation is such that a person has entered as far as the internal detection area A2 of the human sensor unit 600 and in this case, the mode automatically returns from the power-saving mode (ST1). Because of this, the power-saving LED 513 is turned off to notify a user that pressing-down of the power-saving button 512 is not necessary. In the example in FIG. 12C, a message screen for notifying a user of the login standby state is also displayed on the screen of the LCD touch panel 524.

FIG. 12D shows a display state in the normal power mode (ST4). Then, the situation is one after a user has held an NFC compatible device above the NFC unit 700 in the NFC unit operable mode (ST2) or in the login standby mode (ST3). Because of the state where each function of the image forming apparatus 100 can be used immediately, the NFC LED 711 for guiding the touch operation using the authentication card or the like is in the unlit state and a menu screen for a user to select a function to be used is displayed on the LCD touch panel 524.

FIGS. 13A to 13C are diagrams each showing an example of a guidance display using the LED on the operation unit 500 in each operation mode of the image forming apparatus 100 in the case where the multi-login is set to be effective. The case where the operation mode is the power-saving mode (ST1), the case where the operation mode is the NFC unit operable mode (ST2), and the case where the operation mode is the login standby mode (ST3) are the same as those in the case where the multi-login is set to be ineffective, and therefore, omitted and only the case where the operation mode is the normal power mode (ST4) whose contents of the guidance display are different is shown.

FIG. 13A shows a display state in the case where a person is detected in the normal power mode (ST4). In the case where a person is detected in the internal detection area A2 of the human sensor unit 600 in the normal power mode (ST4), the NFC LED 711 is in the lit (blinking) state and the above-described menu screen is displayed on the LCD touch panel 524.

FIG. 13B shows a display state in the case where a person has disappeared from the detection area in the normal power mode (ST4). For example, the case where a user in the login state causes the copying machine or the like to function and leaves the copying machine until copying is completed in the situation shown in FIG. 13A corresponds to the situation in FIG. 13B. In the case such as this, the NFC LED 711 turns off after a person disappears from the detection area of the human sensor unit 600. In this situation, a screen 1301 indicating the state of progress of the copy job is also displayed on the screen of the LCD touch panel 524 and further, the notification LED 527 that indicates that the job is being performed turns on.

FIG. 13C shows a display state in the case where a person is detected again while the job is being performed in the normal power mode (ST4). In the example described above, in the case where the user in the login state who has given instructions to perform copying or another user enters the detection area of the human sensor unit 600, the NFC LED 711 turns of (blinks) again. Due to this, it is possible for a user who is trying to log in to know the position where the touch operation using an NFC compatible device for login authentication should be performed and the fact that the communication by the NFC system (i.e., multi-login) can be performed. By the notification LED 527 turning on, it is also possible to understand that some job, such as copying, is being performed.

While taking the guidance display as above to be the basic operation, it may also be possible to bring the NFC LED 711 into the unlit state for a fixed period of time so that a user can recognize the fact that the user has logged in by means of the NFC LED 711 during the user's operation to log in. Further, it may also be possible to bring the NFC LED 711 into the unlit state for a period of time before the user who has logged in inputs a job.

FIG. 14 is a table putting together the lit state/the unlit state for each condition of the NFC LED 711 and the power-saving LED 513 according to the present embodiment.

The NFC LED 711 is in the unlit state in the case where no person is detected by the human sensor unit 600 in the situation where the image forming apparatus 100 is in the power-saving mode (ST1). Then, in the case where the human sensor unit 600 detects a person, the mode moves into the NFC unit operable mode (ST2) and the NFC LED 711 turns on again. At this time, the power-saving LED 513 also turns on. In the login standby mode (ST3), the NFC LED 711 keeps the lit state until an NFC compatible device is held above the NFC unit 700. However, in the case where a person disappears from the detection area of the human sensor unit 600 in the state where the mode has returned from the power-saving mode, the NFC LED 711 turns off.

In the case where the multi-login setting is ineffective, on a condition that a user logs in and the mode moves into the normal power mode (ST4), the NFC LED 711 turns off even though no person is detected by the human sensor unit 600. Then, after the user logs out, the mode moves from the normal power mode (ST4) into the login standby mode (ST3).

In the case where the multi-login setting is effective, in the normal power mode (ST4), the NFC LED 711 switches between the lit state and the unlit state in accordance with the detection state of a person by the human sensor unit 600 (i.e., the NFC LED 711 turns on in the case where a person is detected and turns off in the case where no person is detected).

As described above, in the present embodiment, the lighting control of the NFC LED 711 is different between the case where the multi-login is ineffective and the case where the multi-login is effective. Because of this, it is possible for a user to know whether the multi-login is effective by means of the NFC LED 711. Then, at this time, the guidance display is produced only in the case where a person is detected by the human sensor. In other words, in the case where no person exists in front of the apparatus, no guidance display is produced even in the state where the authentication operation can be performed, and therefore, it is possible to suppress an unnecessary guidance of the authentication operation.

In the present embodiment, as the method for a user to log in, user authentication using an NFC compatible device is explained, but the method is not limited to this. The present embodiment similarly applies to the case where a user is notified of the position where a predetermined user's operation should be performed (position of a dedicated reader above which an authentication card or a portion of the human body is held) based on the technique, for example, such as card authentication using an NFC incompatible authentication card or biometric authentication making use of biometric information on an individual (e.g., the vein of the palm, the iris of the eye, etc.).

As described above, according to the present embodiment, it is possible to notify a user of the position where the user should perform the touch operation using an NFC compatible device and the state where communication can be performed by means of the guidance display of the NFC reader/writer unit. In particular, also in the case where the multi-login by a plurality of users can be performed, it is possible to produce a guidance display easy-to-see for a user.

Second Embodiment

Next, an aspect is explained as a second embodiment in which the image forming apparatus separately includes a card reader for an NFC incompatible authentication card and further, an operation mode is added in which a user transmits and receives data in conjunction with an NFC compatible device after the user has logged in. Explanation of the portions in common to those of the first embodiment is omitted or simplified and in the following, different points are explained mainly.

Figure 15:
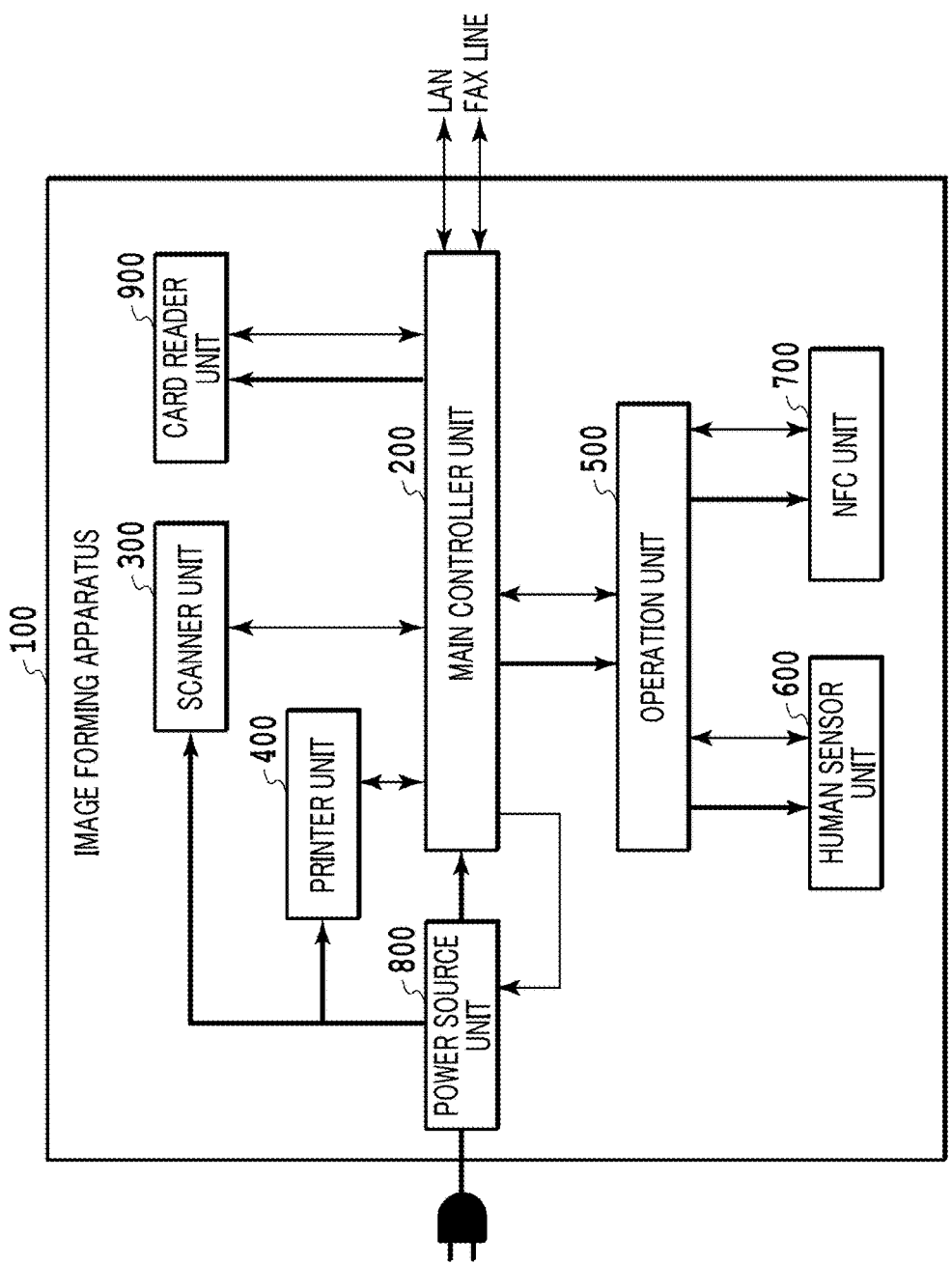
FIG. 15 is a simplified function block diagram of an image forming apparatus according to a second embodiment.
Figure 16:
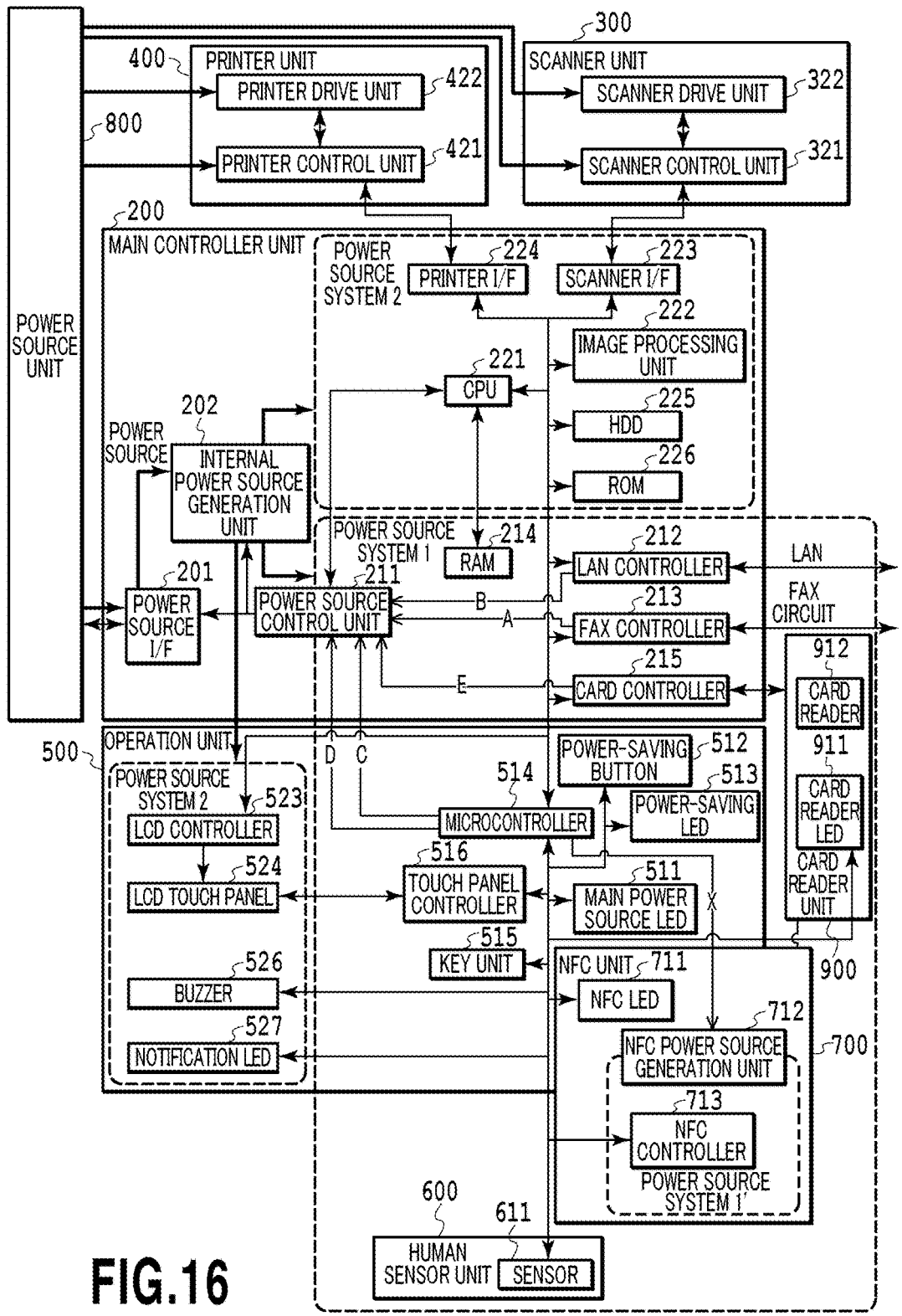
FIG. 16 is a detailed function block diagram of the image forming apparatus according to the second embodiment.

FIG. 15 is a simplified function block diagram of the image forming apparatus 100 according to the present embodiment. The image forming apparatus 100 includes the main controller unit 200, the scanner unit 300, the printer unit 400, the operation unit 500, the human sensor unit 600, the NFC unit 700, the power source unit 800, and a card reader unit 900. FIG. 16 is a block diagram showing details of each component (function unit) shown in FIG. 15. The second embodiment differs from the first embodiment in that the dedicated card reader unit 900 for reading an NFC incompatible authentication card (compatible with a wireless communication system other than the NFC system) is added and in that the connections related to the card reader unit 900 are added. Specifically, a card controller 215 is provided inside the main controller unit 200 and the card controller 215 is connected with a card reader 912 within the card reader unit 900. The card reader unit 900 includes the card reader 912 and a card reader LED 911. The lit (blinking) state/the unlit state of the card reader LED 911 is controlled by the microcontroller 514 of the operation unit 500.

Figure 17:
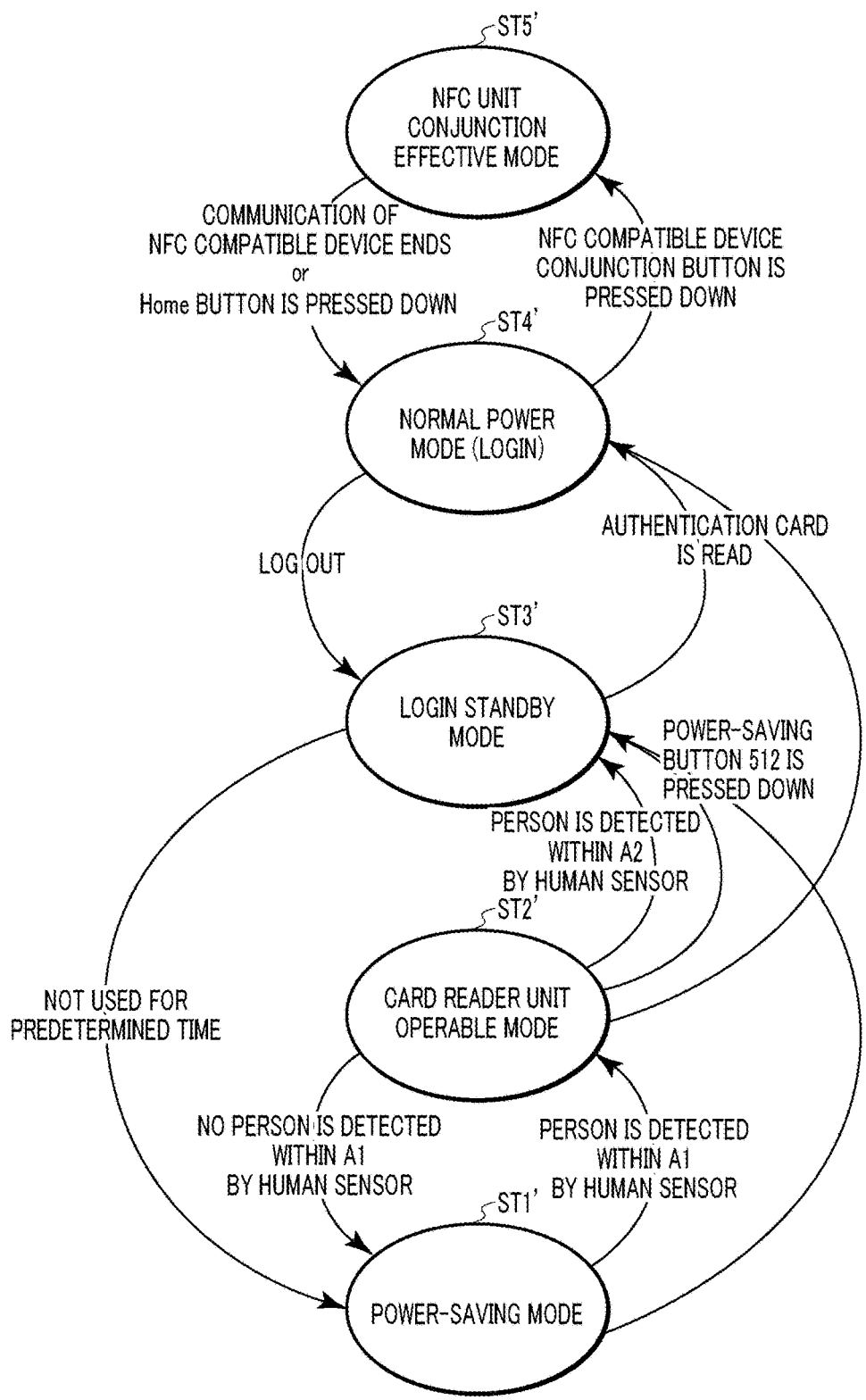
FIG. 17 is a transition diagram of an operation mode of the image forming apparatus according to the second embodiment.

FIG. 17 is a transition diagram of the operation mode of the image forming apparatus 100 according to the present embodiment. As the operation mode in the present embodiment, there exist a power-saving mode (ST1'), a card reader unit operable mode (ST2'), a login standby mode (ST3'), a normal power mode (ST4'), and an NFC unit conjunction effective mode (ST5'). Here, the NFC unit conjunction effective mode (ST5) is an operation mode in which data communication can be performed based on the communication standard, such as Bluetooth (registered trademark) and Wi-Fi, by performing pairing between an NFC compatible device, such as a smart phone, and the image forming apparatus 100 after login is completed.

FIG. 18 to FIG. 22 are diagrams each showing a state where power is supplied to each unit constituting the image forming apparatus 100 in each operation mode in the present embodiment. In the following, explanation is given in order.

Figure 18:
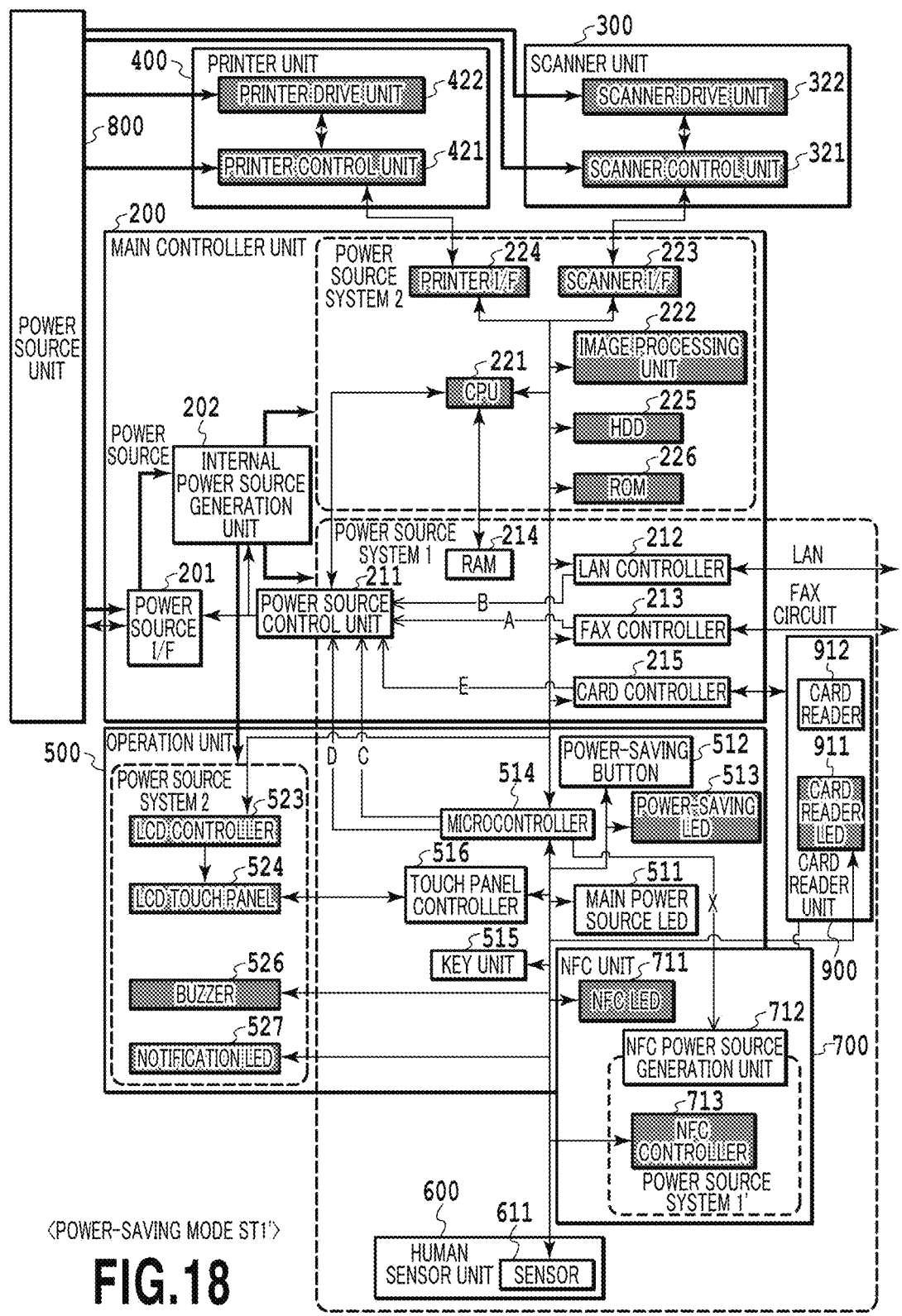
FIG. 18 is a diagram showing a state where power is supplied to each unit constituting the image forming apparatus in a power-saving mode of the second embodiment.

In the power-saving mode (ST1'), as shown in FIG. 18, the NFC unit 700 is in the inoperable state (the NFC LED 711 is in the unlit state), but the card reader 912 and the card controller 215 are in the energized state and in the state where the operation to recognize a card can be performed. This mode supposes a case as an example where a user tries to log in by stretching his/her hand from a blind spot, such as a position outside the detection area of the human sensor unit 600, to hold an authentication card above. However, in order to suppress power consumption, the card recognition operation is performed, for example, at two-second intervals. The microcontroller 514 periodically receives the detection signal from the human sensor unit 600 and on detecting that a person has entered the external detection area A1 or the internal detection area A2, the microcontroller 514 causes the power-saving LED 513 and the card reader LED 911 to turn on (blink) and moves the mode into the card reader unit operable mode (ST2').

Figure 19:
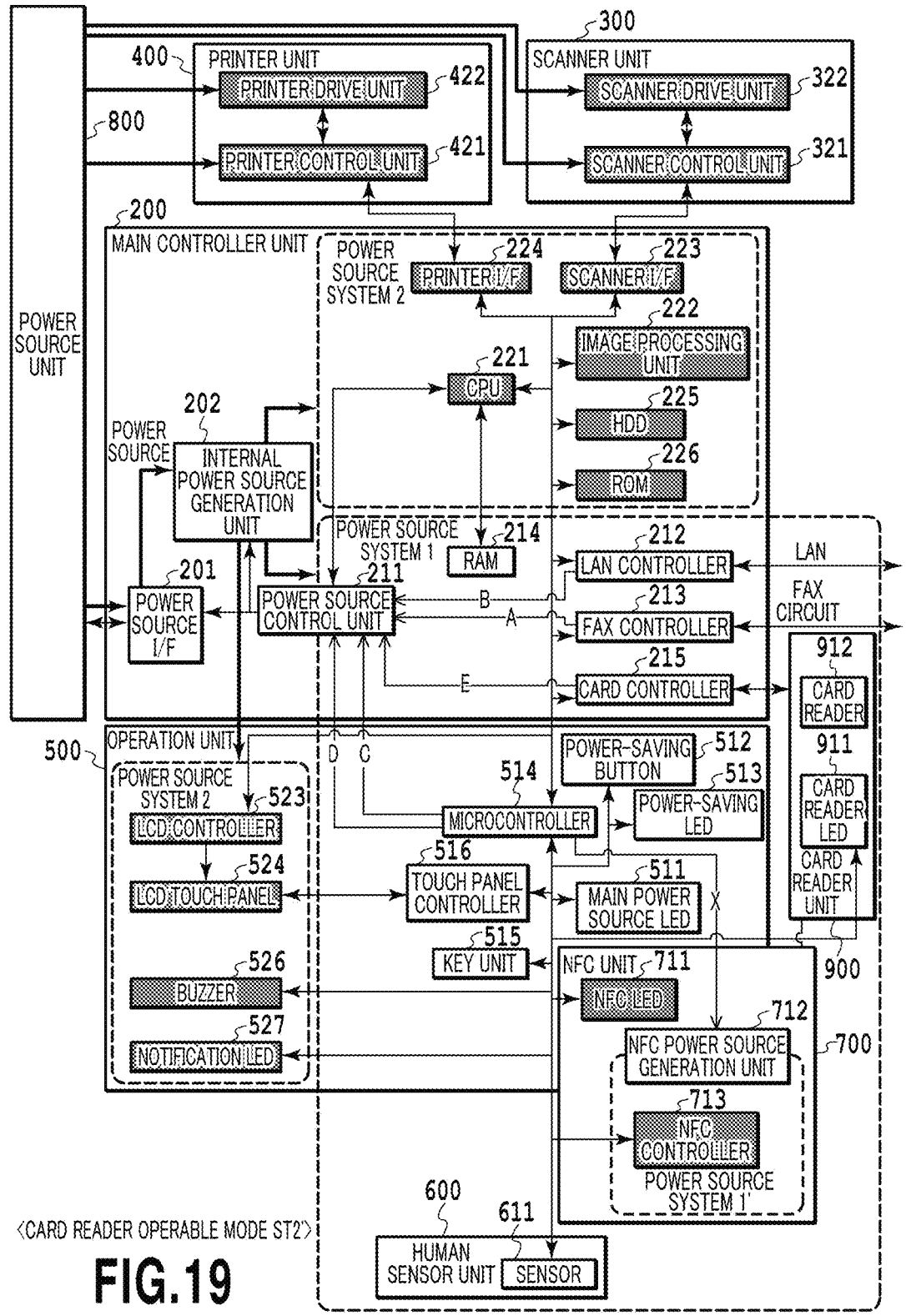
FIG. 19 is a diagram showing a state where power is supplied to each unit constituting the image forming apparatus in an NFC unit operable mode of the second embodiment.

In the card reader unit operable mode (ST2'), as shown in FIG. 19, the microcontroller 514 causes the power-saving LED 513 and the card reader LED 911 to turn on (blink). Further, the microcontroller 514 instructs the card controller 215 to shorten the authentication card recognition interval (e.g., to 100 msec). Upon receipt of the instructions, the card controller 215 performs the card recognition operation at predetermined short intervals to increase the response speed of card recognition. Then, after a person disappears from the sensor detection area A1, the microcontroller 514 terminates the lit (blinking) state of the power-saving LED 513 and the card reader LED 911. On the other hand, in the case of detecting a state where a person has entered as far as the internal detection area A2 during a predetermined period of time, the microcontroller 514 outputs the interrupt signal C to the power source control unit 211. Upon receipt of the interrupt signal C, the power source control unit 211 supplies power to the power source system 2 of the main controller unit 200, the power source system 2 of the operation unit 500, the scanner control unit 321, and the printer control unit 421. Then, the CPU 221 having received the supply of power and activated restores the state stored within the RAM 214 and moves the mode into the login standby mode (ST3').

Figure 20:
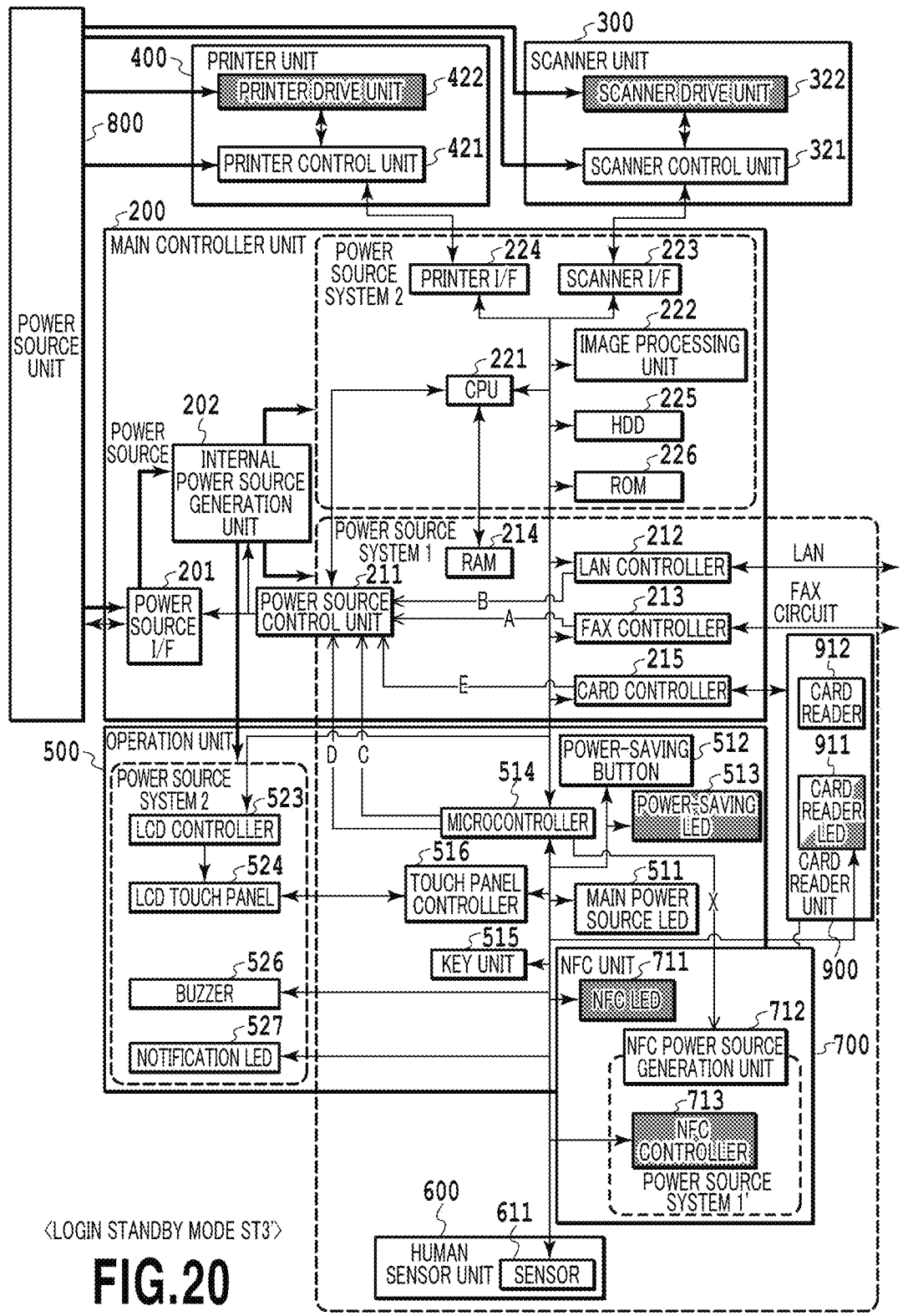
FIG. 20 is a diagram showing a state where power is supplied to each unit constituting the image forming apparatus in a login standby mode of the second embodiment.

In the login standby mode (ST3'), as shown in FIG. 20, the power-saving LED 513 is in the unlit state at all times. However, the card reader LED 911 is in the lit (blinking) state in the case where a person has been detected by the human sensor unit 600 and in the unlit state where no person has been detected. Due to this, it is possible to notify a user that the operation to press down the power-saving button 512 is not necessary and that the card reader unit 900 is operable.

In the case where a login authentication card is held above the card reader 912 in one of the card reader unit operable mode (ST2') and the login standby mode (ST3'), the card controller 215 outputs the interrupt signal E to the power source control unit 211. Upon receipt of the interrupt signal E, the power source control unit 211 starts the supply of power to the power source system 2 in the case where the supply of power thereto is stopped and sends an authentication request signal to the CPU 221. Upon receipt of the authentication request signal, the CPU 221 performs user authentication processing. After the user authentication is completed, the mode moves into the normal power mode (ST4').

Figure 21:
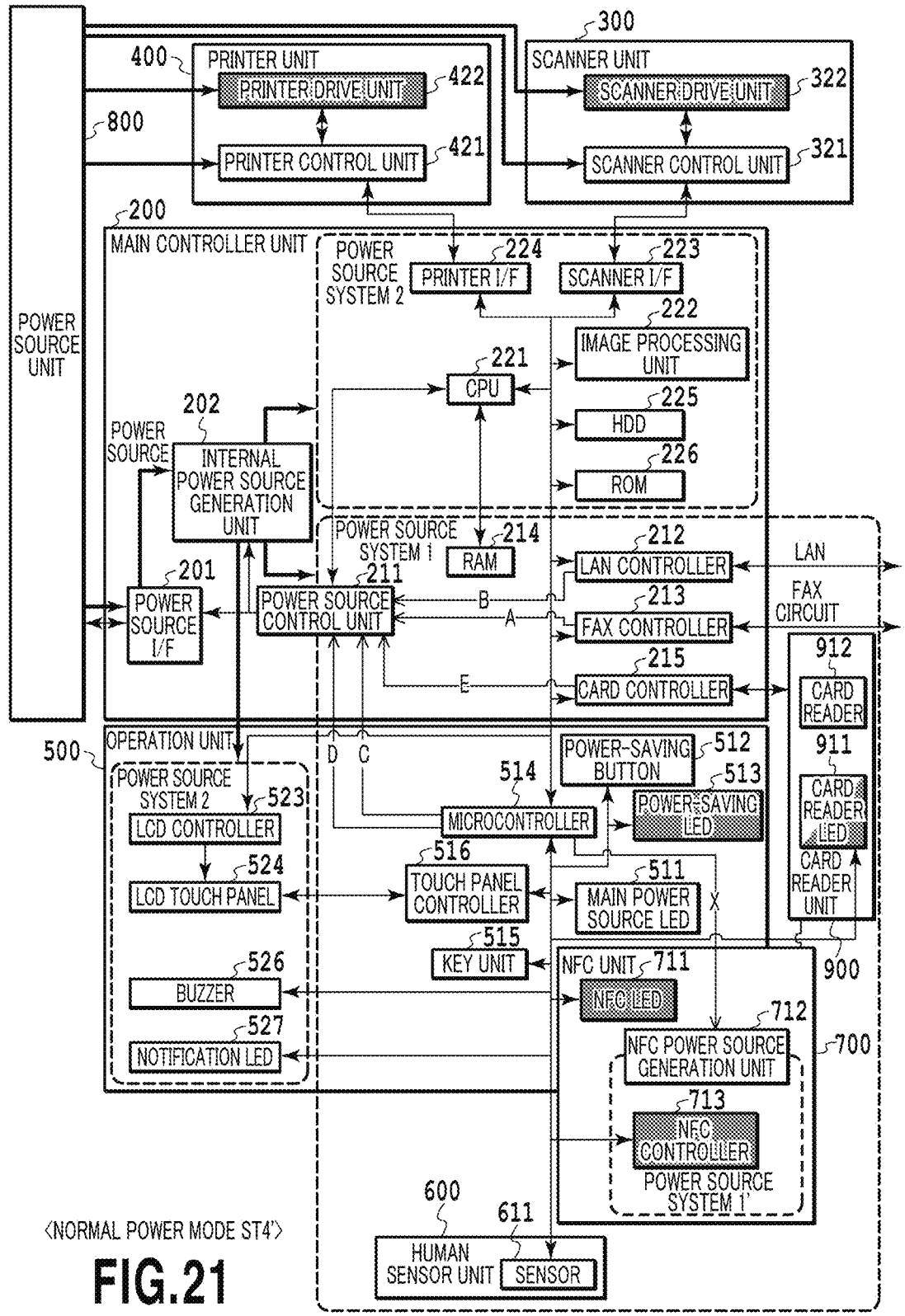
FIG. 21 is a diagram showing a state where power is supplied to each unit constituting the image forming apparatus in a normal power mode of the second embodiment.

In the normal power mode (ST4'), the lighting control of the card reader LED 911 is different in accordance with whether the setting of the multi-login is effective or ineffective (see FIG. 21). Further, in the case where the multi-login setting is ineffective, the card reader LED 911 is in the unlit state at all times regardless of whether or not a person is detected by the human sensor unit 600. Due to this, it is possible for a user to recognize that it is no longer necessary to hold an authentication card above the card reader unit 900 and that there is another user in the login state. After the user logs off, the image forming apparatus 100 moves into the login standby mode (ST3'). Then, in the case where the multi-login setting is effective, the card reader LED 911 turns on (blinks) or turns off in accordance with the detection state of a person by the human sensor unit 600. In the situation of the normal power mode (ST4') such as this, in the case where an NFC COMPATIBLE DEVICE CONJUNCTION button 530 (see FIG. 23D) that is displayed on the LCD touch panel 524 of the operation unit 500 is pressed down, the mode makes a transition into the NFC unit conjunction effective mode (ST5').

Figure 22:
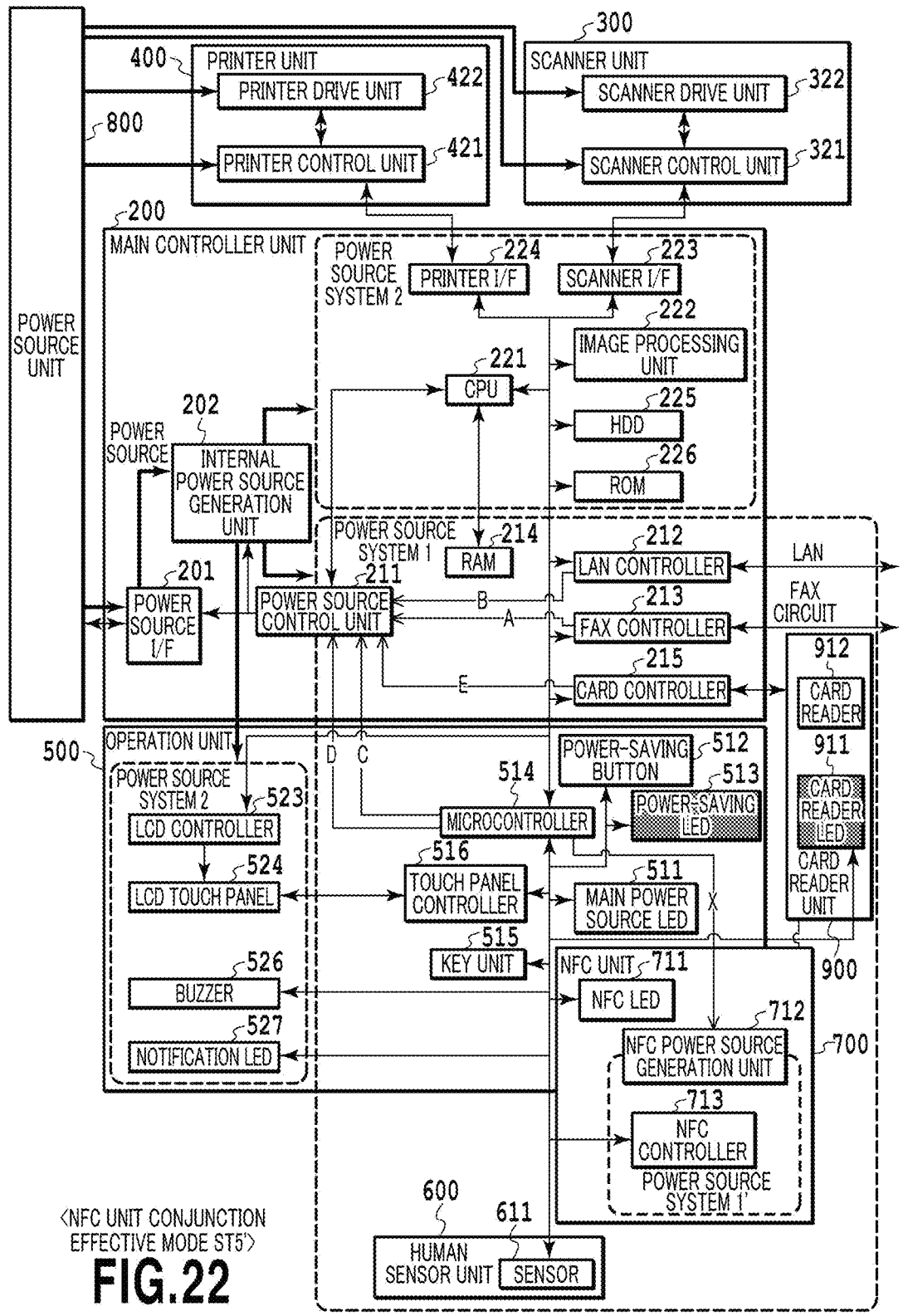
FIG. 22 is a diagram showing a state where power is supplied to each unit constituting the image forming apparatus in an NFC unit conjunction effective mode of the second embodiment.

In the NFC unit conjunction effective mode (ST5'), as shown in FIG. 22, the NFC controller 713 is energized and becomes operable and the NFC LED 711 enters the lit (blinking) state. Due to this, a user is notified of the position where the touch operation using an NFC compatible device, such as a smart phone, is performed for pairing. In the NFC unit conjunction effective mode (ST5'), the NFC LED 711 is in the lit (blinking) state at all times regardless of whether or not a person is detected by the human sensor unit 600.

FIGS. 23A to 23E are diagrams each showing an example of a guidance display using the LED on the operation unit 500 in each operation mode described above of the image forming apparatus 100 in the case where the multi-login is set to be ineffective according to the present embodiment.

Figure 23A:
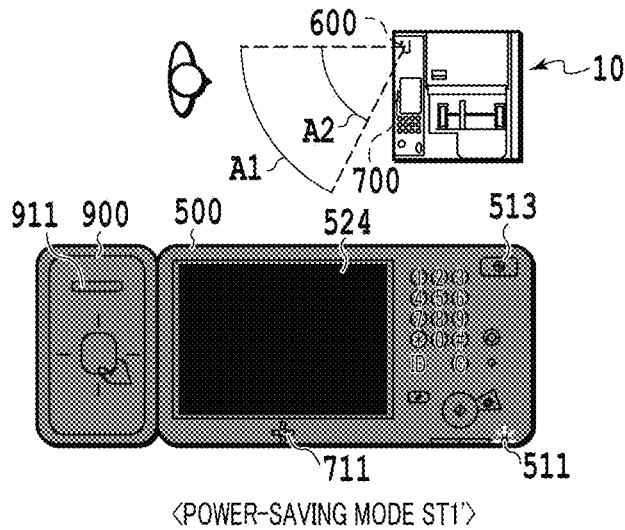
FIGS. 23A to 23E are diagrams each showing an example of a guidance display in each operation mode described above of the image forming apparatus in the case where the multi-login is set to be ineffective according to the second embodiment.

FIG. 23A shows a display state in the power-saving mode (ST1') and only the main power source LED 511 is in the lit state. In this situation, in the case where a person enters the external detection area A1 or the internal detection area A2 of the human sensor unit 600, the mode moves into the card reader unit operable mode (ST2').

Figure 23B:
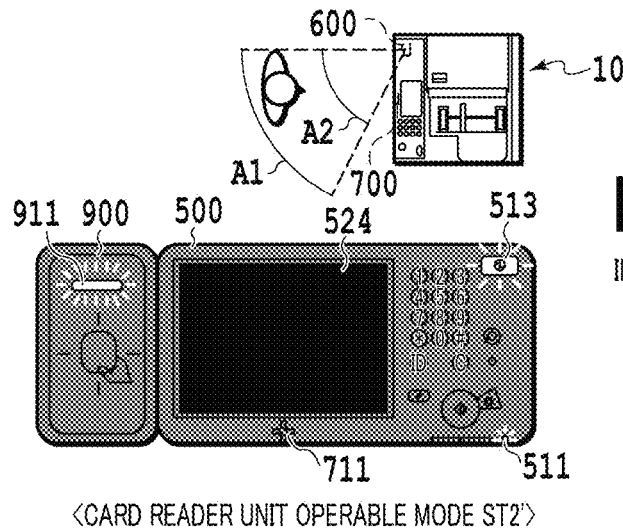

FIG. 23B shows a display state in the card reader unit operable mode (ST2') and the power-saving LED 513 and the card reader LED 911 are in the lit (blinking) state. Due to this, a user is notified of the position of the card reader unit 900 and that the card reader unit 900 can perform communication. In this situation, in the case where a person comes close to the internal detection area A2 and a predetermined period of time or more elapses with this state being kept, the mode moves into the login standby mode (ST3').

Figure 23C:
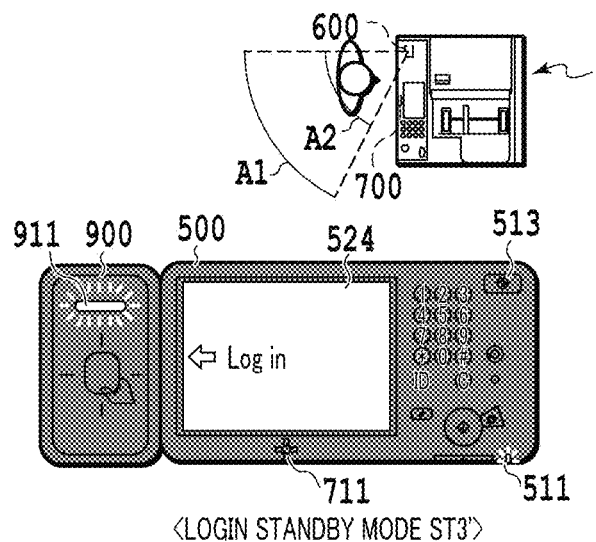

FIG. 23C shows a display state in the login standby mode (ST3'). The login standby mode is a mode close to the normal power state and it is not necessary to press down the power-saving SW 512, and therefore, the power-saving LED 513 is in the unlit state.

Figure 23D:
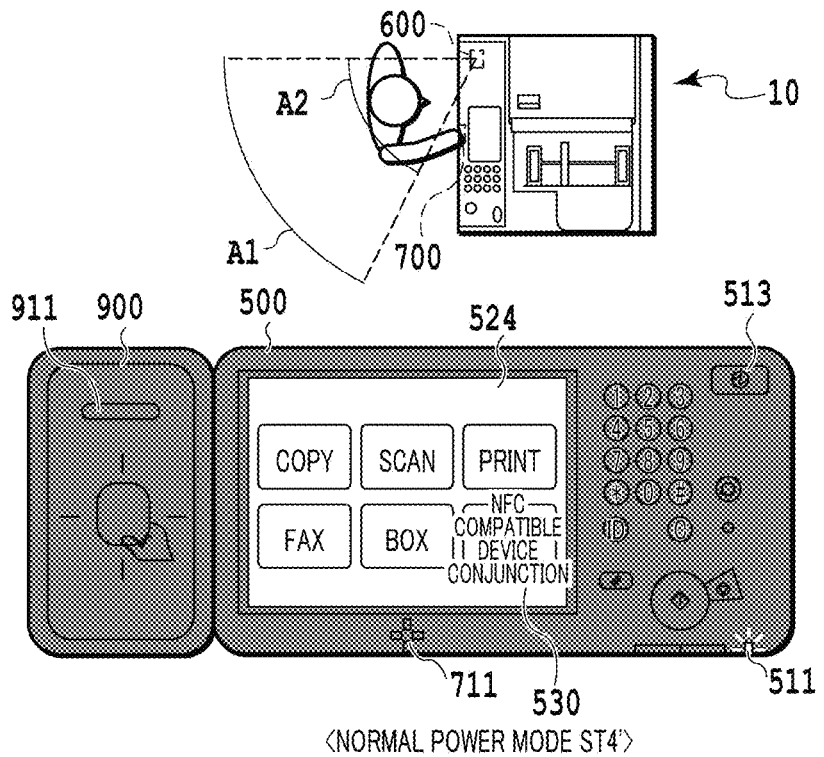

FIG. 23D shows a display state in the normal power mode (ST4'). In the case where the touch operation using an authentication card to the card reader unit 900 is performed in the card reader unit operable mode (ST2') or in the login standby mode (ST3'), user authentication processing is performed and the mode moves into this normal power mode (ST4'). In FIG. 23D, a "HELP button" portion in FIG. 12D of the first embodiment is changed into the "NFC COMPATIBLE DEVICE CONJUNCTION button 530". The NFC COMPATIBLE DEVICE CONJUNCTION button 530 is a button for moving the state into the operation state where data communication can be performed by performing pairing between the image forming apparatus 100 and an NFC compatible device. In the normal power mode (ST4') in the case where the multi-login setting is ineffective, the card reader LED 911 is in the unlit state. Due to this, it is possible for a user to grasp that the operation to hold an authentication card above is no longer necessary. In this situation, in the case where the NFC COMPATIBLE DEVICE CONJUNCTION button 530 is pressed down, the mode moves into the NFC unit conjunction effective mode (ST5').

Figure 23E:
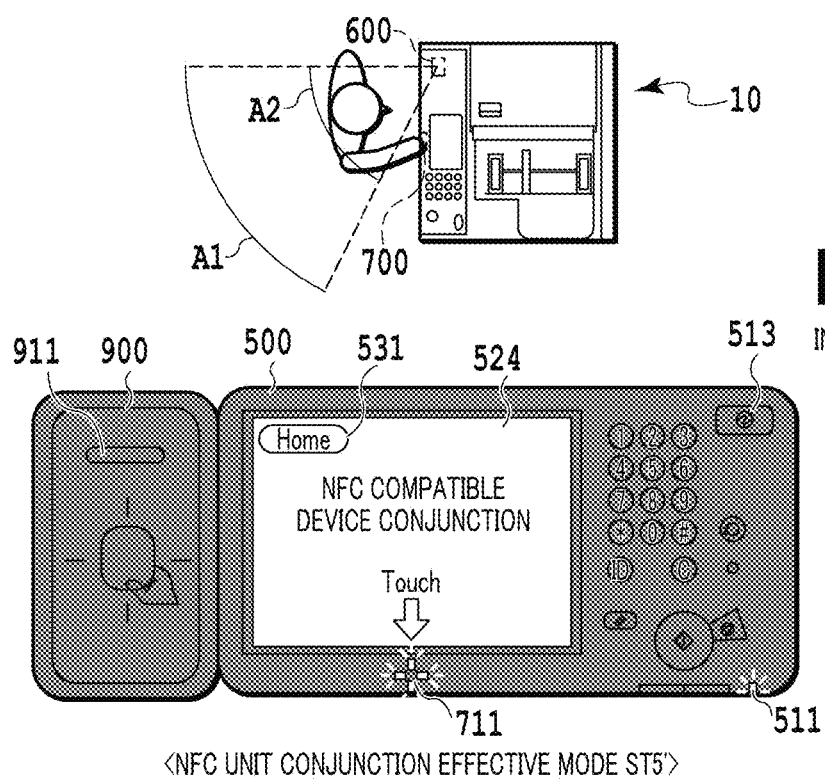

FIG. 23E shows a display state in the NFC unit conjunction effective mode (ST5'). In the case where the above-described NFC COMPATIBLE DEVICE CONJUNCTION button 530 is pressed down in the normal power mode, the mode moves into the NFC unit conjunction effective mode (ST5'). In the NFC unit conjunction effective mode (ST5'), the NFC LED 711 is in the lit (blinking) state. Due to this, a user is notified of the position where an NFC compatible device, such as a smart phone, is held above and that the communication by the NFC system can be performed. During this period of time, the card reader LED 911 is in the unlit state regardless of the detection state of a person by the human sensor unit 600.

Figure 24A:
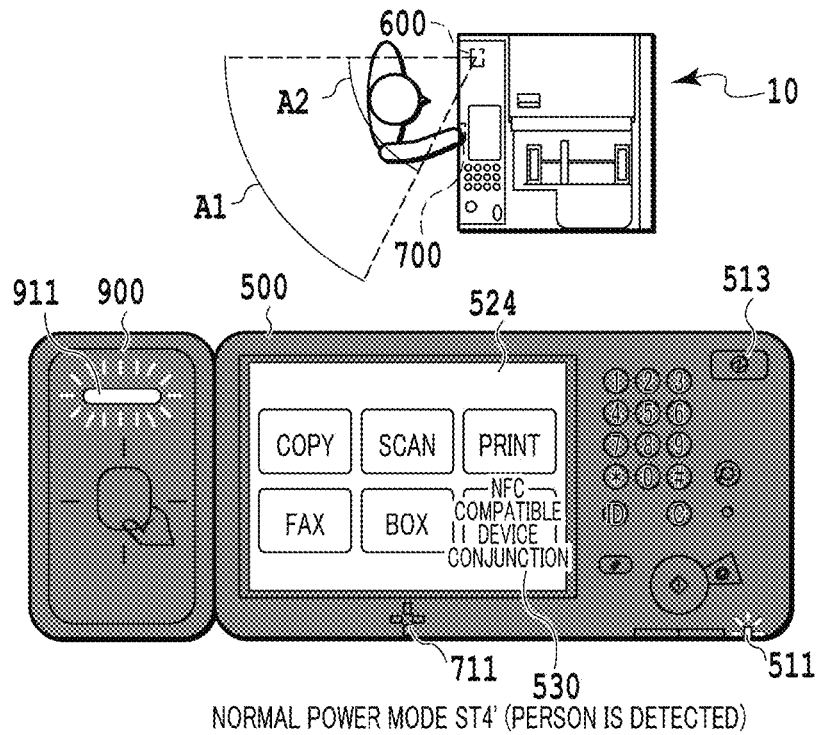
FIGS. 24A and 24B are diagrams each showing an example of a guidance display in each operation mode described above of the image forming apparatus in the case where the multi-login is set to be effective according to the second embodiment.
Figure 24B:
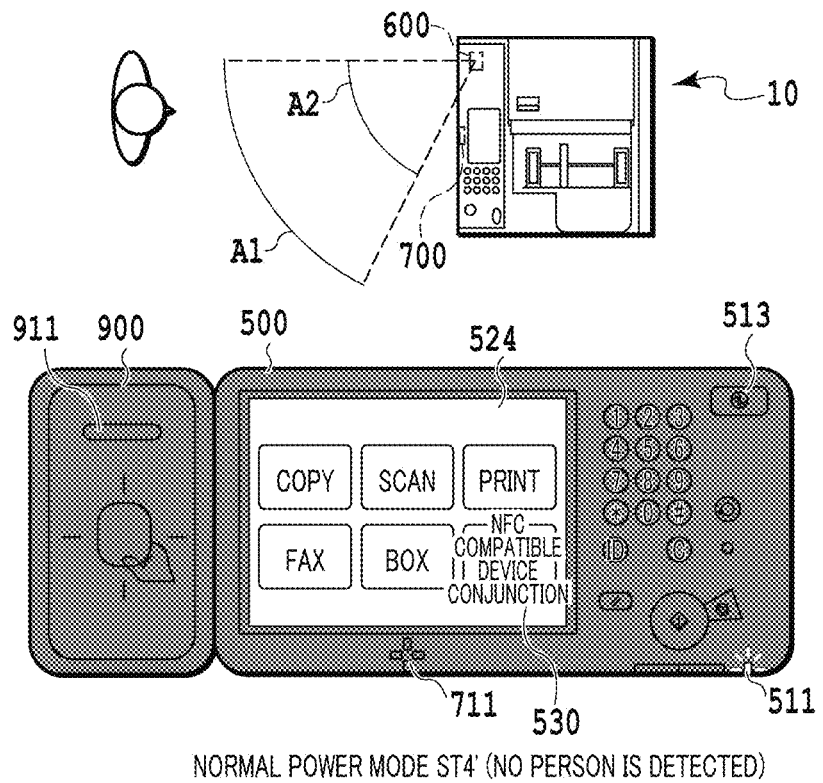

FIGS. 24A and 24B are diagrams each showing an example of a guidance display using the LED on the operation unit 500 in each operation mode described above of the image forming apparatus 100 in the case where the multi-login is set to be effective according to the present embodiment. The power-saving mode (ST1'), the card reader unit operable mode (ST2'), the login standby mode (ST3'), and the NFC unit conjunction effective mode (ST5') are the same as those in the case where the multi-login setting is ineffective. Consequently, in FIGS. 24A and 24B, only the display state in the normal power mode (ST4') is shown.

In the normal power mode (ST4') in the case where the multi-login is set to be effective, as described above, the card reader LED 911 turns on (blinks) or turns off in accordance with the detection state of a person by the human sensor unit 600. In other words, in the case where a user holds an authentication card above the card reader unit 900 and the mode moves into the normal power mode (ST4'), and a person is detected by the human sensor unit 600, the card reader LED 911 remains in the lit (blinking) state and the menu screen at the time of the normal operation is displayed on the LCD touch panel 524 (see FIG. 24A). After that, in the case where a user in the login state leaves the detection area of the human sensor unit 600 after causing the apparatus to perform a function, such as copying, the card reader LED 911 turns off (see FIG. 24B). After that, in the case where a user (the user in the login state or another user) is detected by the human sensor unit 600, the card reader LED 911 turns on (blinks) again.

FIG. 25 is a table putting together the lit state/the unlit state for each condition of the card reader LED 911, the NFC LED 711, and the power-saving LED 513 according to the present embodiment.

In the case where no person is detected by the human sensor unit 600 in the situation where the image forming apparatus 100 is in the power-saving mode (ST1'), the card reader LED 911 is in the unlit state. Then, in the case where a person is detected in the detection area A1 of the human sensor unit 600, the mode moves into the card reader unit operable mode (ST2') and the card reader LED 911 enters the lit (blinking) state. In the login standby mode (ST3'), the card reader LED 911 remains in the lit (blinking) state until an authentication card is held above the card reader unit 900. However, in the case where the person disappears from the detection area of the human sensor unit 600 in the state where the image forming apparatus 100 has returned from the power-saving mode (ST1'), the card reader LED 911 turns off.

Then, in the case where the multi-login setting is ineffective, on a condition that a user logs in and the mode moves into the normal power mode (ST4'), the card reader LED 911 turns off regardless of the detection state of a person by the human sensor unit 600. After that, in the case where the user logs out, the mode moves into the login standby mode (ST3').

On the other hand, in the case where the multi-login setting is effective, on a condition that a user logs in and the mode moves into the normal power mode (ST4'), the lighting state of the card reader LED 911 changes in accordance with the detection state of a person by the human sensor unit 600 (i.e., the card reader LED 911 is in the lit state in the case where there is a person and in the unlit state in the case where there is no person).

In the NFC unit conjunction effective mode (ST5'), the card reader LED 911 is in the unlit state regardless of the detection state of a person by the human sensor unit. During this period of time, the NFC LED 711 is in the lit state regardless of the detection state of a person by the human sensor unit 600.

Then, the power-saving LED 513 remains in the lit state during the period of time of the NFC unit operable mode (ST2').

As described above, according to the present embodiment, the guidance display in the card reader unit or the NFC reader/writer unit changes in accordance with the situation. Due to this, it is possible for a user to know whether the card reader and an NFC compatible device are in the state where communication can be performed, in addition to the position of the card reader and the position where the touch operation using the NFC compatible device is performed. Because of this, it is possible for a user to perform the touch operation that is necessary at the appropriate position without being confused even in the case of an image forming apparatus in which there exists a plurality of positions where the touch operation is performed for a card and a device that require the touch operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to notify a user of the position or the like where the user should perform a predetermined user's operation for login in an easy-to-see manner in an apparatus capable of multi-login.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-262480, filed, Dec. 25, 2014, which is hereby incorporated by reference wherein in their entirety.

What is claimed is:

1. An apparatus capable of multi-login that allows a plurality of users to simultaneously log in, the apparatus comprising:
a guidance display unit configured to indicate a position where a predetermined user's operation for login should be performed by lighting;
a human sensor configured to detect a person who exists within a predetermined range of the apparatus; and
a control unit configured to control the lighting of the guidance display unit in accordance with whether a setting of the multi-login is effective or ineffective, wherein
in a case where a user in the login state exists, the control unit:
controls, on a condition that the multi-login is set to be ineffective, the guidance display unit to turn its light off regardless of whether or not a person is detected by the human sensor; and
controls, on a condition that the multi-login is set to be effective, the guidance display unit to turn its light on when a person is detected by the human sensor and controls the guidance display unit to turn its light off when no person is detected by the human sensor.

2. The apparatus according to claim 1, wherein
in a case where the user in the login state disappears, the control unit controls the guidance display unit to turn its light on when a person is detected by the human sensor and controls the guidance display unit to turn its light off when no person is detected by the human sensor, regardless of whether the setting of the multi-login is effective or ineffective.

3. The apparatus according to claim 1, wherein
in a case where the multi-login is set to be effective, the control unit controls, until a predetermined period of time elapses after a user has logged in, the guidance display unit to turn its light off regardless of the detection state of a person by the human sensor.

4. The apparatus according to claim 1, wherein
in a case where the multi-login is set to be effective, the control unit controls, until a user who has logged in inputs a job, the guidance display unit to turn its light off regardless of the detection state of a person by the human sensor.

5. The apparatus according to claim 1, wherein
in a case where the multi-login is set to be effective, the control unit controls, until a user who has logged in is no longer detected by the human sensor, the guidance display unit to turn its light off regardless of the detection state of a person by the human sensor.

6. The apparatus according to claim 1, wherein
the predetermined user's operation is an operation to hold external equipment capable of wirelessly communicating with the apparatus above the position.

7. The apparatus according to claim 6, wherein
the external equipment is an NFC compatible device and the wireless communication is NFC.

8. The apparatus according to claim 6, wherein
the external equipment is an authentication card used for performing authentication of a user who intends to use the apparatus.

9. The apparatus according to claim 1, wherein
the predetermined user's operation is an operation to hold above part of the human body for biometric authentication using biometric information on an individual.

10. A control method for an apparatus capable of multi-login that allows a plurality of users to simultaneously log in and including a human sensor configured to detect a person who exists within a predetermined range, the method comprising the steps of:
indicating a position where a predetermined user's operation for login should be performed by lighting: and controlling the lighting in accordance with whether a setting of the multi-login is effective or ineffective, wherein in a case where a user in the login state exists, the control step:

controls, on a condition that the multi-login is set to be ineffective, the lighting not to be performed regardless of whether or not a person is detected by the human sensor; and controls, on a condition that the multi-login is set to be effective, the lighting to be performed when a person is detected by the human sensor and controls the lighting not to be performed when no person is detected by the human sensor.

11. A non-transitory computer readable storage medium storing a program for causing a computer to perform a control method for an apparatus capable of multi-login that allows a plurality of users to simultaneously log in and including a human sensor configured to detect a person who exists within a predetermined range, the method comprising the steps of:

indicating a position where a predetermined user's operation for login should be performed by lighting: and controlling the lighting in accordance with whether a setting of the multi-login is effective or ineffective, wherein in a case where a user in the login state exists, the control step:

controls, on a condition that the multi-login is set to be ineffective, the lighting not to be performed regardless of whether or not a person is detected by the human sensor; and controls, on a condition that the multi-login is set to be effective, the lighting to be performed when a person is detected by the human sensor and controls the lighting not to be performed provided that no person is detected by the human sensor.

* * * * *